United States Patent [19]

Hamanishi

[11] Patent Number: 4,641,928
[45] Date of Patent: Feb. 10, 1987

[54] FOUR-GROUP TELEPHOTO ZOOM LENS
[75] Inventor: Yoshinari Hamanishi, Tokyo, Japan
[73] Assignee: Nippon Kokagu K. K., Tokyo, Japan
[21] Appl. No.: 593,924
[22] Filed: Mar. 27, 1984
[30] Foreign Application Priority Data Mar. 30, 1983 [JP] Japan .................................. 58-54913

[51] Int. Cl.⁴ .......................................... G02B 15/167
[52] U.S. Cl. .................................................... 350/427
[58] Field of Search ................................. 350/423, 427
[56] References Cited

U.S. PATENT DOCUMENTS

| | | | |
|---|---|---|---|
| 4,223,981 | 4/1980 | Mizutani et al. | 350/427 |
| 4,456,341 | 6/1984 | Kato | 350/427 |
| 4,468,096 | 8/1984 | Hamanishi | 350/427 |
| 4,468,097 | 8/1984 | Hamanishi | 350/427 |
| 4,504,125 | 3/1985 | Fujii | 350/427 |

Primary Examiner—John K. Corbin
Assistant Examiner—Scott J. Sugarman
Attorney, Agent, or Firm—Shapiro and Shapiro

[57] ABSTRACT

A four-group telephoto zoom lens consists of, in succession from the object side, first group having a positive refracting power and movable on the optical axis of the lens for focusing, second group having a negative refracting power and movable on the optical axis for changing a composite focal distance of an entire system, a third group having a positive refracting power and movable on the optical axis for maintaining image plane at a fixed position and a fourth group as relay lens system having a positive refracting power. The second group consists of a first cemented negative lens component having, in the order from the object side, a positive lens and a negative lens cemented together and a second cemented negative lens component having a negative lens and a positive lens cemented together. The four-group telephoto zoom lens further satisfies a certain condition.

17 Claims, 18 Drawing Figures

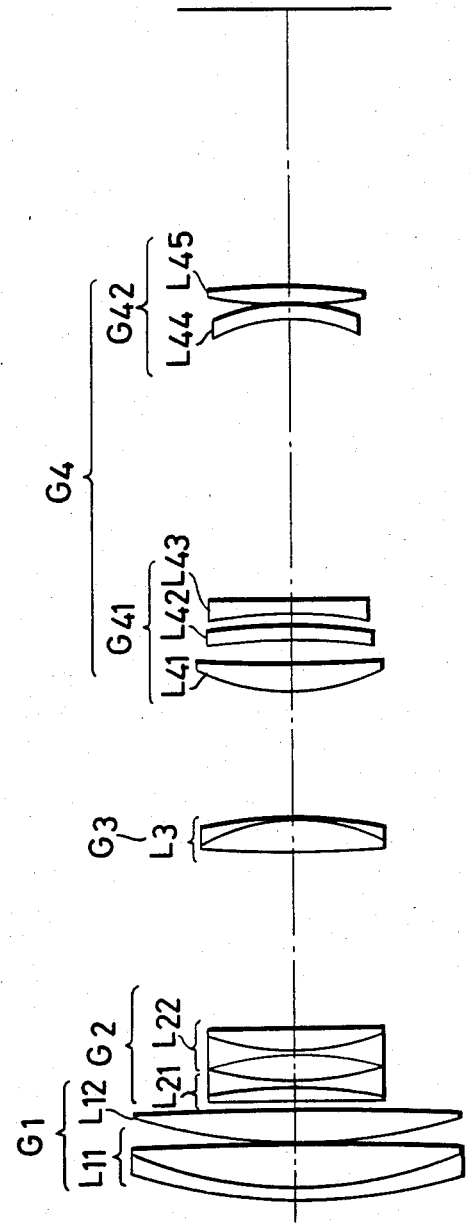

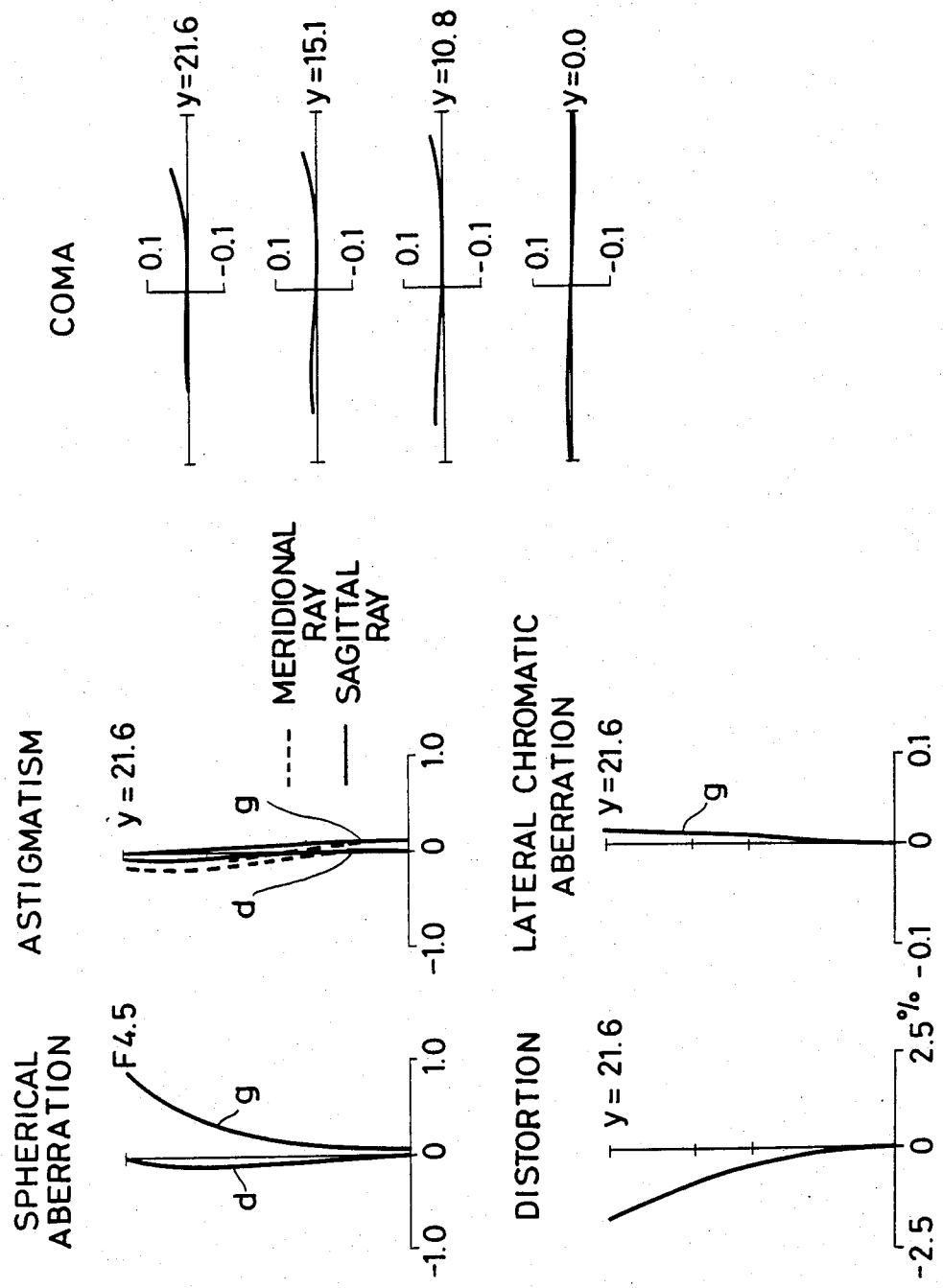

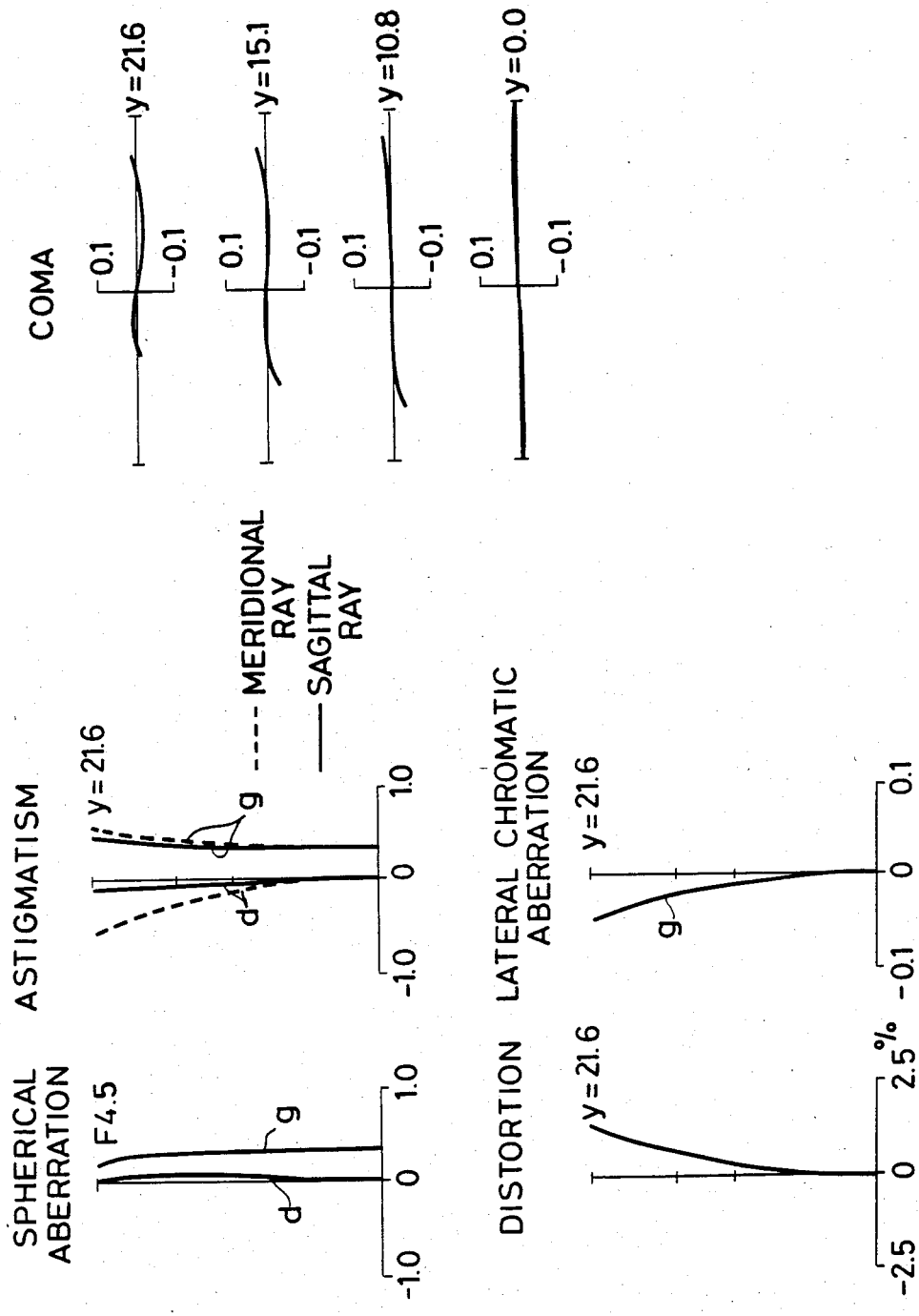

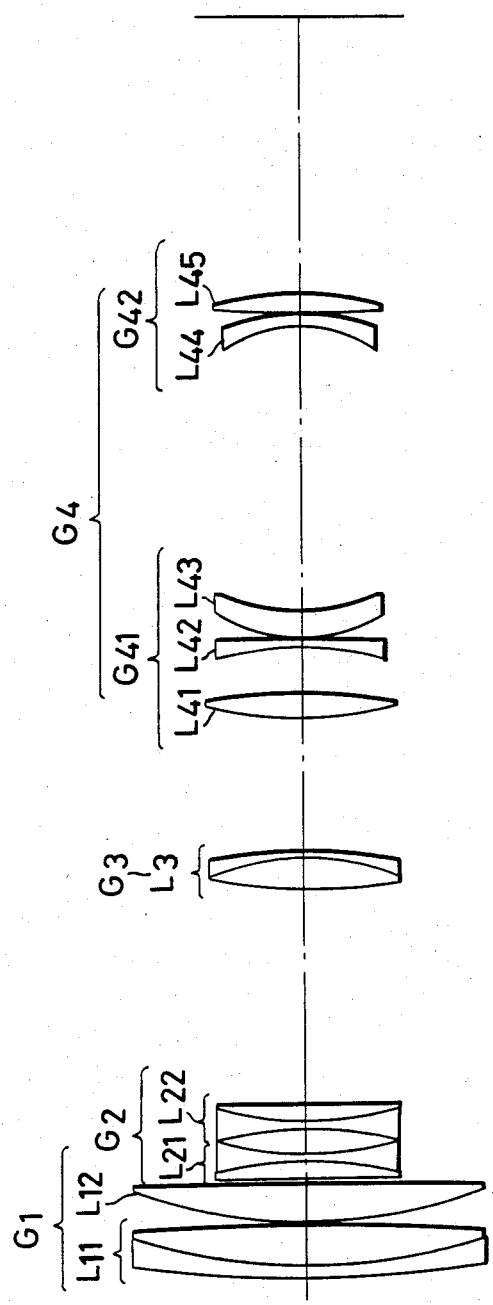

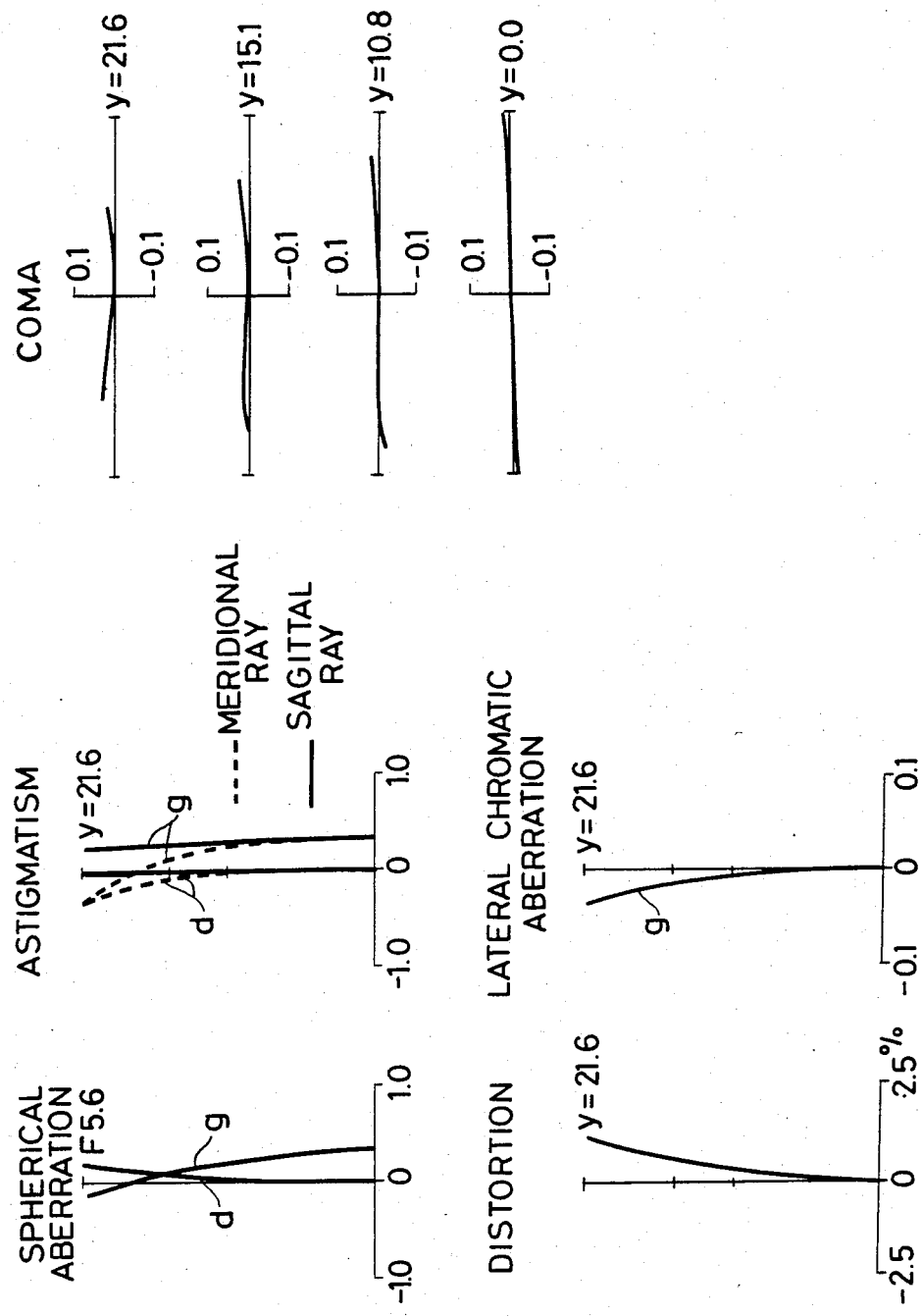

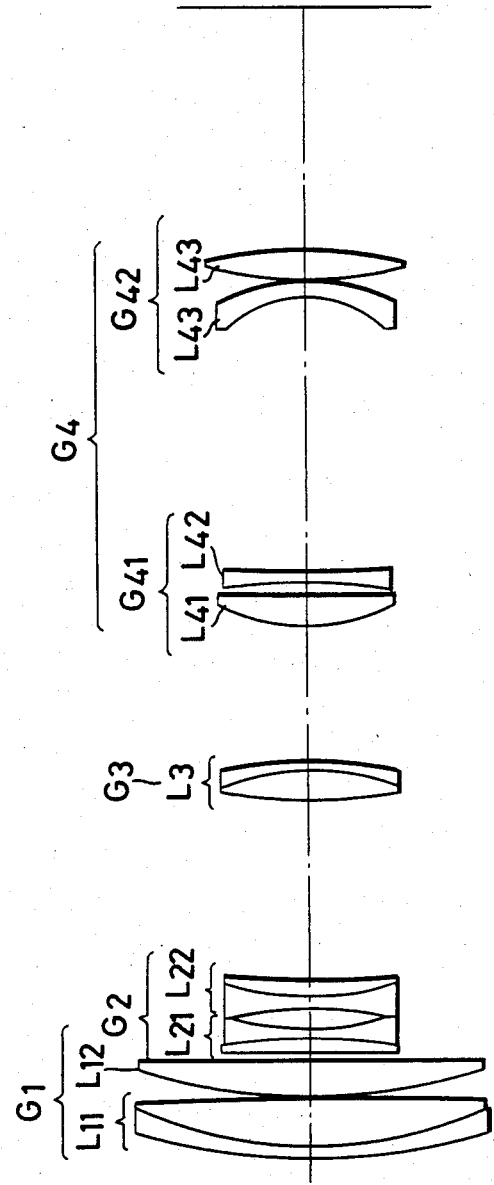

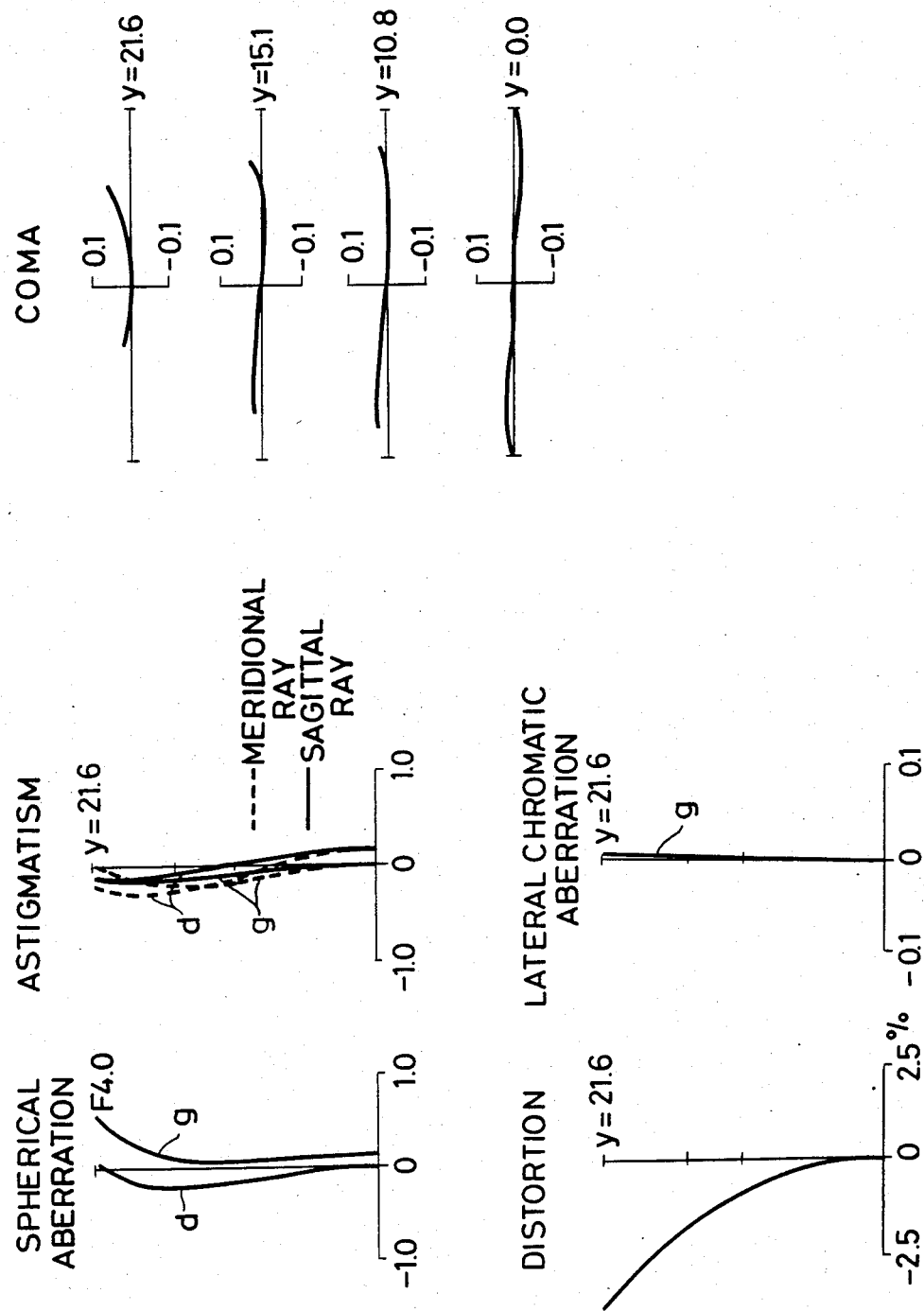

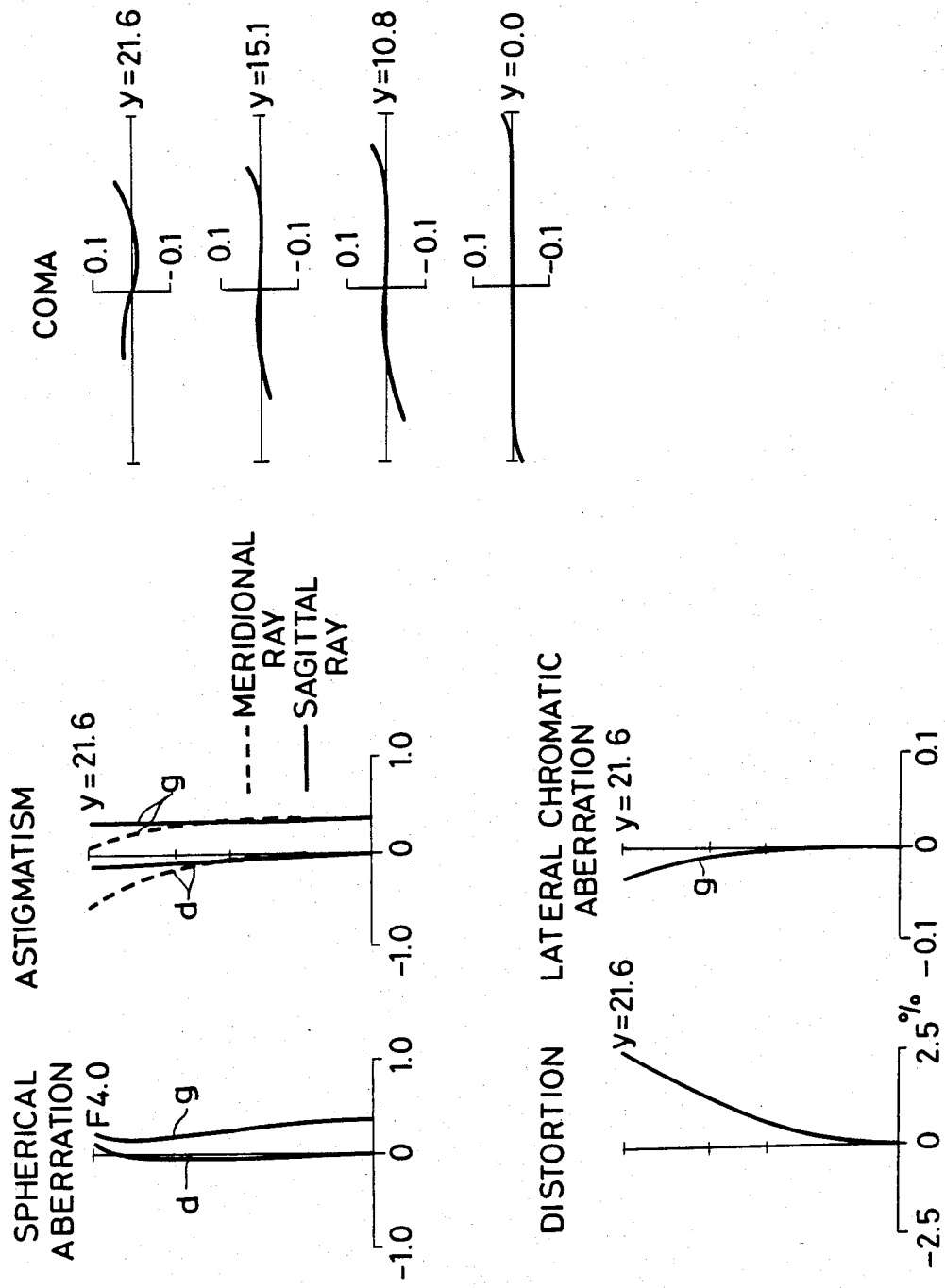

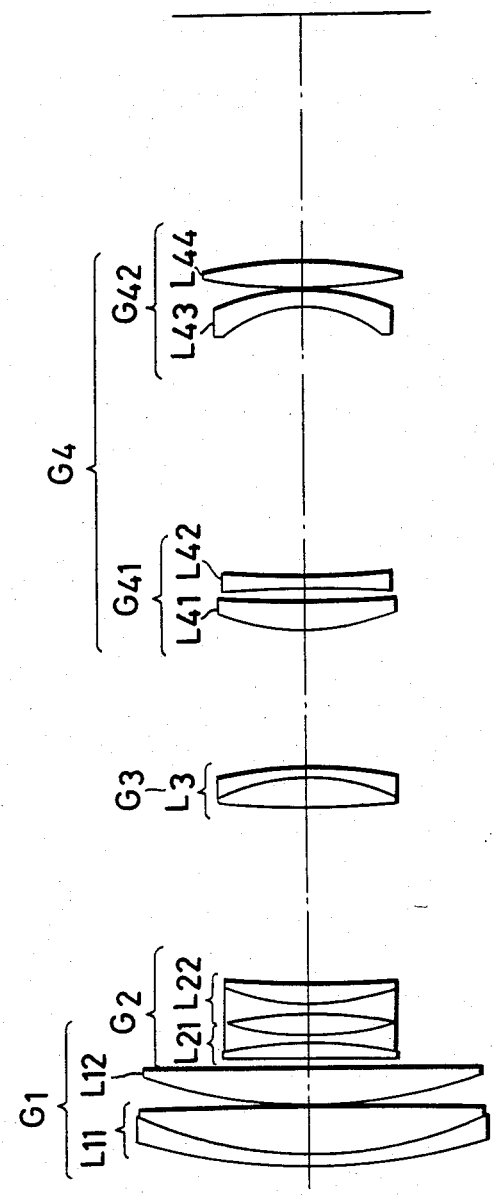

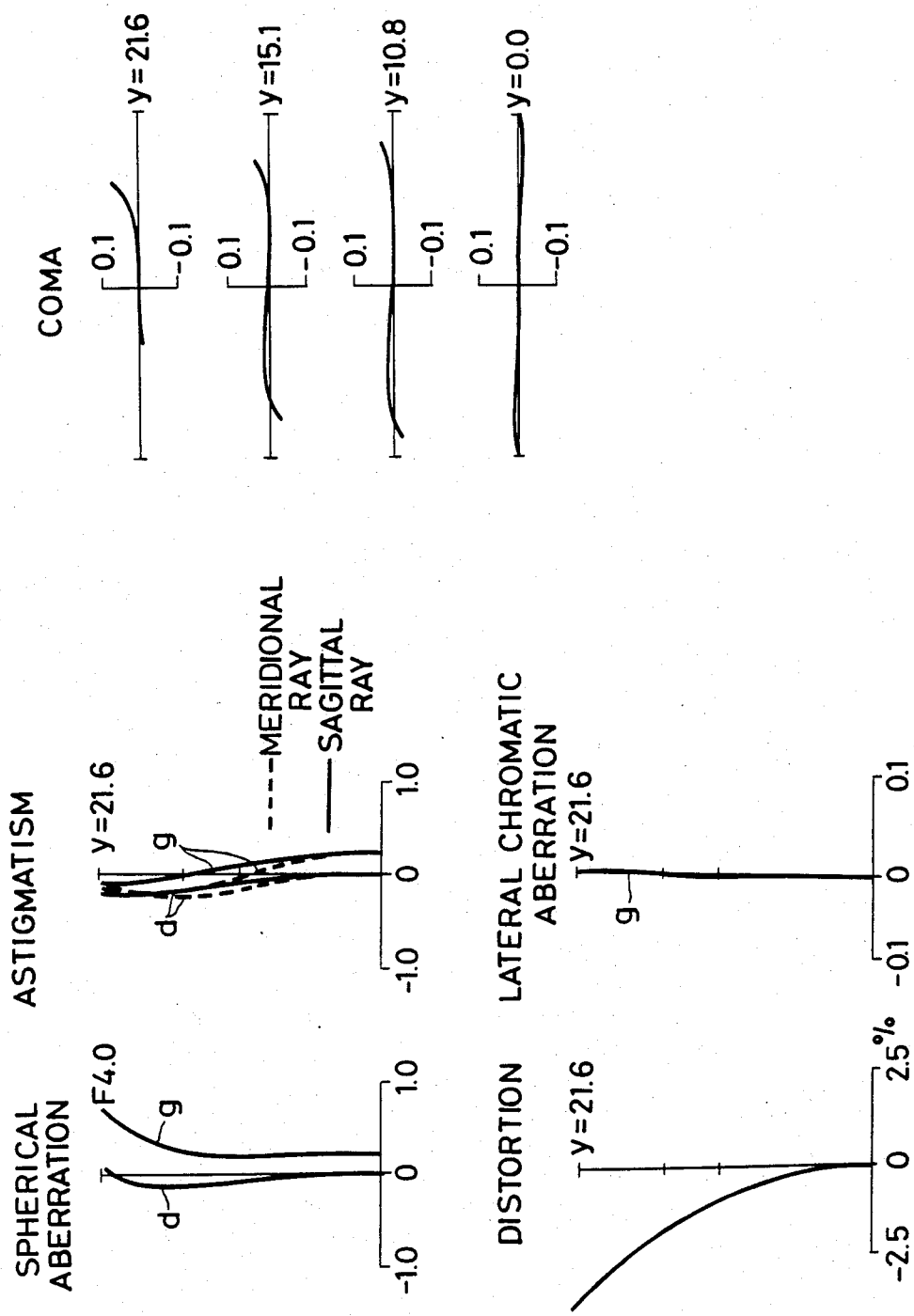

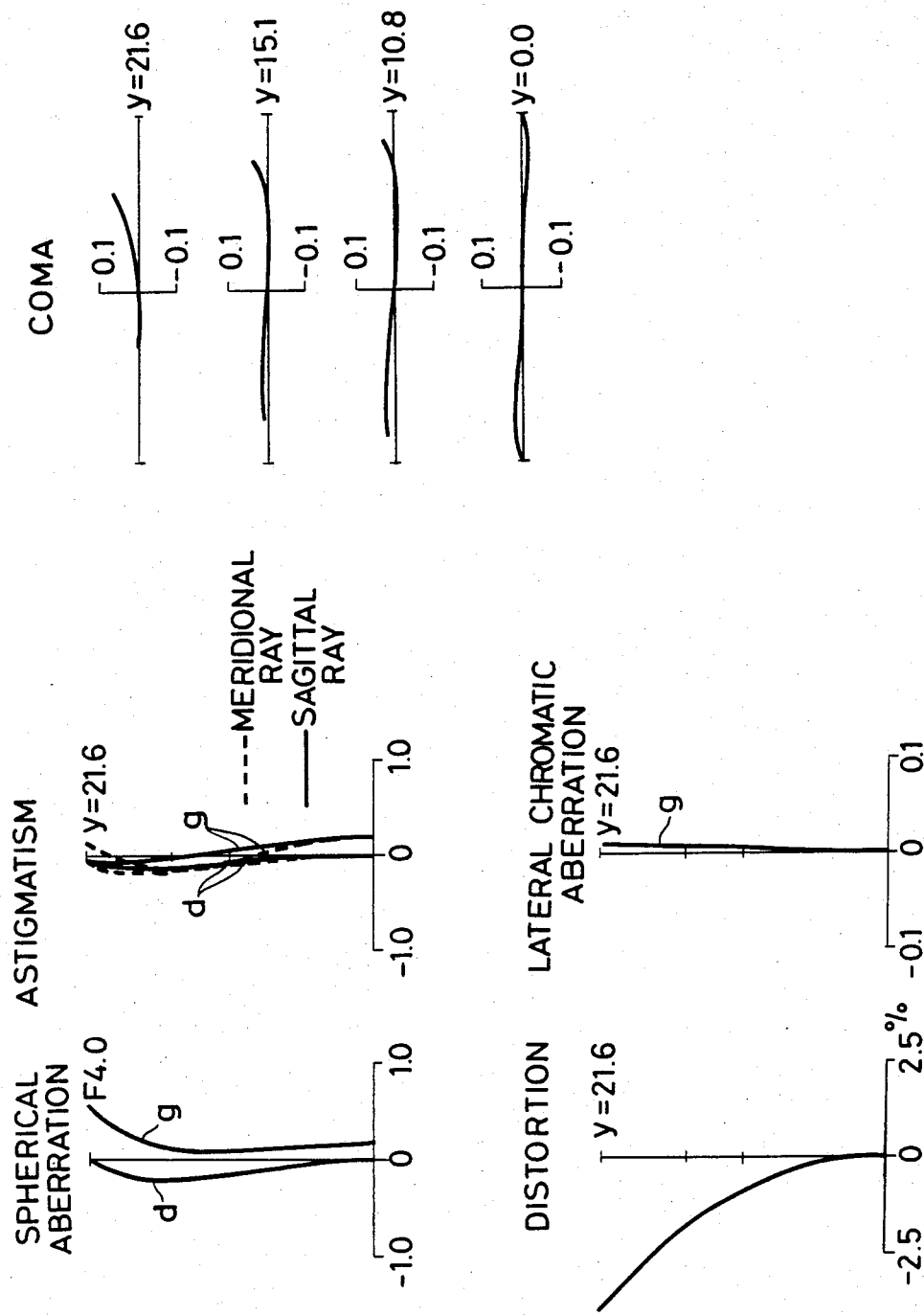

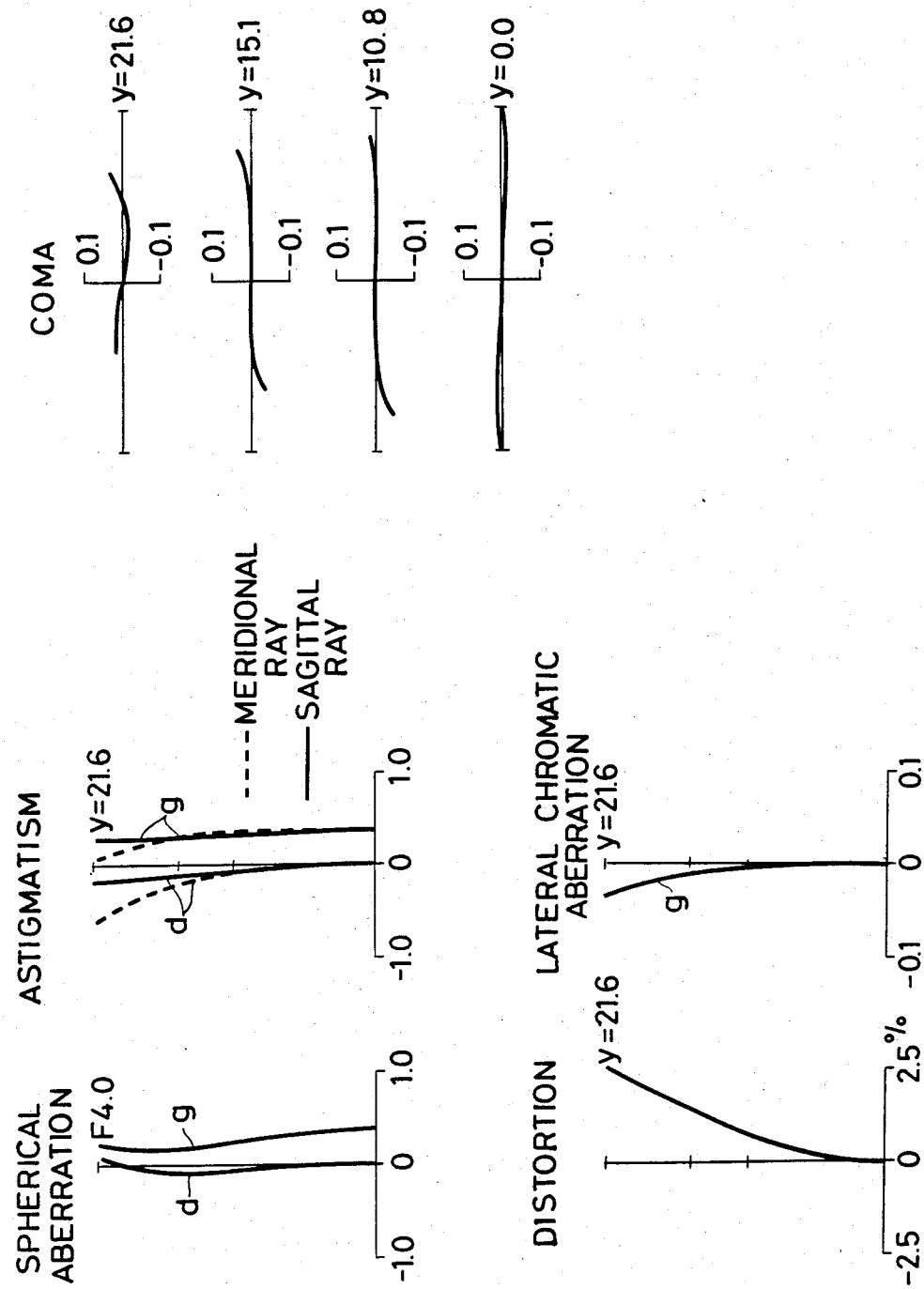

FOUR-GROUP TELEPHOTO ZOOM LENS

BACKGROUND OF THE INVENTION

1. Field of the Invention

The present invention relates to a compact telephoto zoom lens having a zooming ratio of 3 or so.

2. Description of the Prior Art

In a four-group zoom lens which has an afocal variator system consisting of focusing group, variator group and compensator group, and a relay system, it is generally necessary to make the entire system very compact in consideration of its commodity worth if its zooming ratio is 3 or so. If a negative refracting power of a second group as variator group is made stronger for attaining the compactness, it becomes such a factor that the Petzval sum is greatly negative and further spherical aberration, astigmatism, coma and chromatic aberration due to zooming are inclined to be greatly varied. And, if a refracting power of a first group as focusing group is made stronger for attaining the compactness, fluctuation of spherical aberration and astigmatism become large at the time of short distance focusing at the long focus side so that an imaging performance is inclined to be greatly deteriorated. Further, if a fourth group as relay system is made a structure of telephoto type for attaining the compactness of the entire lens system, large zonal spherical aberration and astigmatic difference create and the production of chromatic aberration is remarkable so that it was difficult to maintain excellent imaging performance over the whole of zooming range.

SUMMARY OF THE INVENTION

An object of the present invention is to provide four-group telephoto zoom lens which has a compact structure and yet having an excellent imaging performance over the whole of variable power range.

BRIEF DESCRIPTION OF THE DRAWINGS

FIGS. 1A, 2A, 3A, 4A, 5A and 6A show a lens arrangement of first, second, third, fourth, fifth and sixth embodiment, respectively, according to the present invention. FIGS. 1B, 2B, 3B, 4B, 5B and 6B show various aberrations in the shortest focal distance condition of the first to sixth embodiments, respectively. FIGS. 1C, 2C, 3C, 4C, 5C and 6C show various aberrations in the longest focal distance condition of the first to sixth embodiments, respectively.

DESCRIPTION OF THE PREFERRED EMBODIMENTS

Figure 2B:
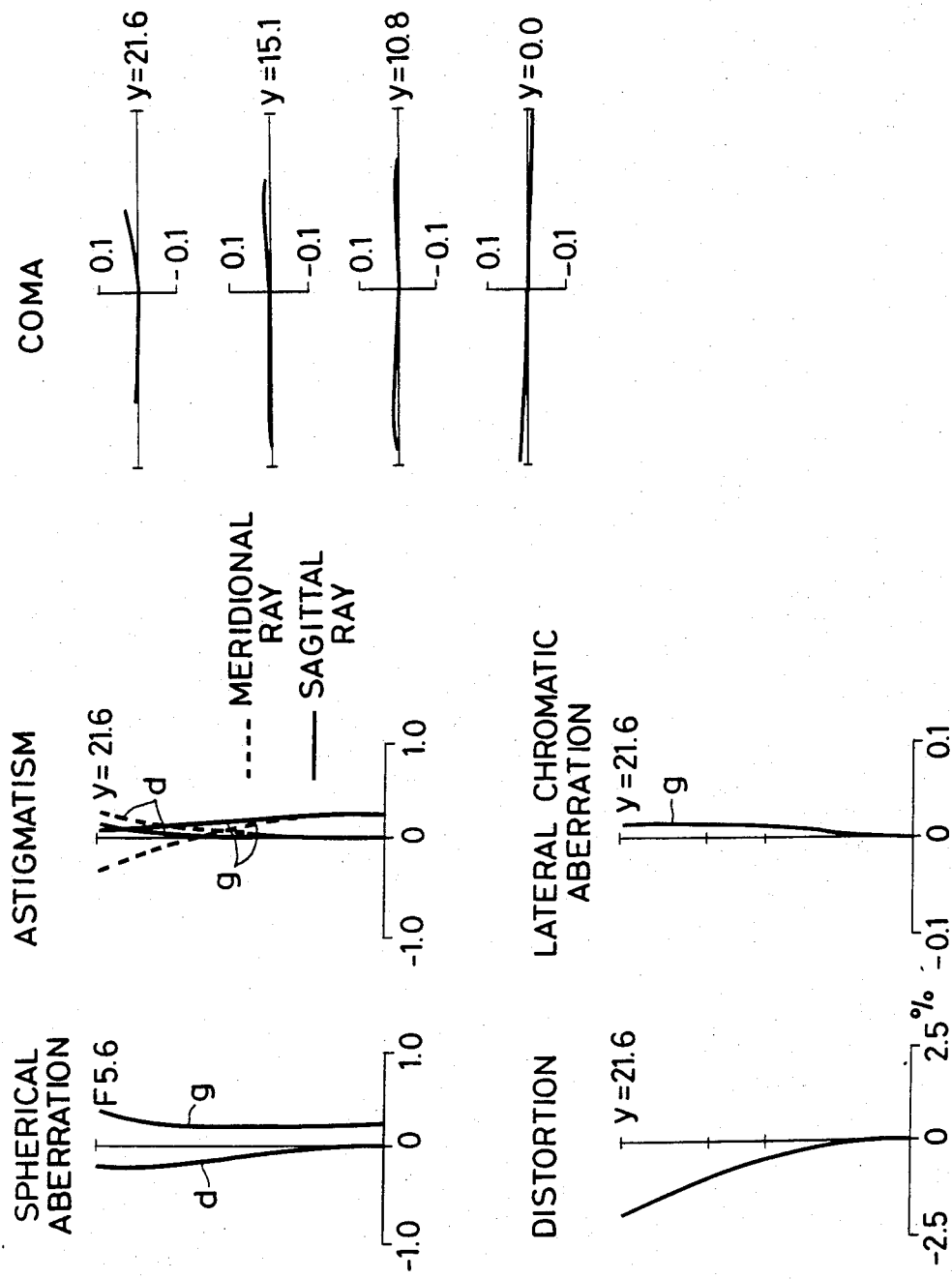

The present invention is, as shown in the embodiments in the accompanying drawings, that in four-group zoom lens consisting of, in succession from the object side, a first group $G_1$ as focusing group having a positive refracting power and movable on the optical axis of the lens for focusing, a second group $G_2$ as variator group having a negative refracting power and movable on the optical axis for changing a composite focal distance of the entire system, a third group $G_3$ as compensator group having a positive refracting power and movable on the optical axis for maintaining image plane at a constant position and a fourth group $G_4$ as relay lens system having a positive refracting power, said second group is composed of, a first cemented negative lens component $L_{21}$ consisting of, in succession from the object side, a positive lens and a negative lens and a second cemented negative lens component $L_{22}$ consisting of a negative lens and a positive lens and the following conditions are satisfied:

$$0.5 < f_{21}/f_{22} < 1.0 \quad (1)$$

$$1.5 < f_{21}/f_2 < 2.1 \quad (2)$$

$$2.0 < f_{22}/f_2 < 2.8 \quad (3)$$

$$-0.09 < n_4 - n_5 < 0.09 \quad (4)$$

$$0.09 < n_7 - n_6 < 0.2 \quad (5)$$

wherein $f_{21}$ and $f_{22}$ represent focal distances of said first and second cemented negative lens components $L_{21}$ and $L_{22}$ in said second group, respectively; $f_2$ represents a composite focal distance of said second group $G_2$, $n_4$ and $n_5$ indicate refractive indexes of positive lens and negative lens, respectively, in said firt negative lens component $L_{21}$; and $n_6$ and $n_7$ represent refractive indexes of negative lens and positive lens, respectively, in said second negative lens component $L_{22}$.

The conditions (1), (2) and (3) are for properly balancing variation in aberration due to zooming in connection with the structure of the second group $G_2$.

If the upper limit in each of the conditions is exceeded, extrovertive coma and astigmatism in a positive sense are excessively large at short focal distance side and spherical aberration becomes excessively positive at long focal distance side and therefore, this is not desirable. On the other hand, if lower limit thereof is exceeded, introversive coma and negative astigmatism are excessively large at short focal distance side and spherical aberration is excessively negative at long focal distance side and therefore, this is undesirable. Further, variation in distortion due to zooming also becomes larger.

The conditions (4) and (5) are for properly balancing variation in aberration due to zooming and variation in chromatic aberration in connection with said two cemented negative lens components $L_{21}$ and $L_{22}$ in the second group $G_2$. If an upper limit of the condition (4) is exceeded, the refracting power of cemented surface in the first negative lens component $L_{21}$ is excessively positive and extrovertive coma near the central point of picture plane produces in excess and astigmatism in color is excessively negative, and Petzval sum is negative in excess at short focal distance side and therefore, this is not desirable. If the lower limit is exceeded, the refracting power of the cemented surface in the first negative lens component $L_{21}$ is excessively negative and at short focal distance side, introversive coma is in excess near the center point of picture plane and at long focal distance side, zonal spherical aberration is also excessive and therefore it is difficult to maintain high imaging performance over the entire variable power range. If the upper limit of the condition (5), Petzval sum becomes negative and astigmatism produces excessively and therefore this is undesirable. If the lower limit is excessive, it is difficult to make a difference in Abbe numbers large. Curvature of cemented surface in the second negative lens component is too strong, so that spherical aberration in color becomes excessive at long focal distance side. If, from the standpoint of correction of chromatic aberration, a difference in Abber numbers of positive lens and negative lens forming second cemented negative lens component $L_{22}$ is made large and a positive lens which is high in refractive index and high in dispersion is used, curvature of the cemented surface is loose naturally and it is possible to well correct chromatic aberration in spherical aberration.

In a fundamental structure of the present invention as shown in the foregoing statement, specifically, for example, as shown in a first embodiment in FIG. 1A, a first group $G_1$ as focusing group consists of a cemented positive lens component $L_{11}$ having, in the order from the object side, a negative lens and a positive lens cemented together and having the surface of sharper curvature directed toward the object side and a positive lens component $L_{12}$ having its surface of sharper curvature directed toward the object side, second group $G_2$ as variator group is composed of a first cemented negative lens component $L_{21}$ having a positive lens and a negative lens cemented together and having its surface of sharper curvature directed toward the image side and a second cemented negative lens component $L_{22}$ having a negative lens and a positive lens cemented together and having the surface if sharper curvature directed toward the object side and a third gorup $G_3$ as compensator group for correction of image plane consists of a single positive lens component or a cemented positive lens component $L_3$. And a fourth group $G_4$ as relay system is composed of forward group $G_{41}$ consisting of, in the order from the object side, a positive and a negative lenses or a positive, a negative, and a positive lenses and a rearward group $G_{42}$ consisting of a negative meniscus lens having the surface convex toward the image side and a positive lens. Incidentally, the forward group $G_{41}$ can consist of only two lenses, a positive lens having the surface of sharper curvature directed toward the object side and a negative lens.

When a focal distance of the cemented positive lens component $L_{11}$ at the object side of the first group $G_1$ is designated by $f_{11}$, and a focal distance of the next positive lens component $L_{12}$ is by $f_{12}$, it is desirable that $1.5 < f_{11}/f_{12} < 3.5$. By this, it is possible that variation in aberration where short distance photographing is effected by shifting the first group toward the object side is made less and a sufficient imaging performance is maintained even if the film-to-object distance is shorter.

If the upper limit of the condition is exceeded, both spherical aberration and astigmatism at long focal distance side are excessively negative and spherical aberration at shortest distance side is varied excessively in the negative sense. This is not desirable. If the lower limit is exceeded, spherical aberration and astigmatism are excessively varied in the positive sense and astigmatism and shortest distance side is excessive. This is also undesirable. Further, lateral chromatic aberration and axial chromatic aberration are under correction at long focal distance side, so that a difference in Abbe number between the positive lens and the negative lens in the cemented positive lens component $L_{11}$ in the first group must be larger or the curvature of the cemented surface in the cemented positive lens component must be sharper. This is undesirable in connection with the correction of aberration. Further, when a focal distance of the positive lens component $L_{12}$ at the image side in the first group is designated by $f_{12}$, a composite focal distance of the first group is designated by $f_1$, and a refractive index of the positive lens in the cemented positive lens component is designated by $n_2$, it is more desirable that such conditions that $1.25 < f_{12}/f_1 < 1.65$, $1.45 < n_2 < 1.68$ are supplementally satisfied.

If close-up photographing is effected at short focal distance side in the zoom lens according to the present invention, as disclosed in the Japanese Laid-open Patent Application No. 208522/1982 which was assigned to the same assignee as in the present invention, the first group is shifted to a usual short distance photographing state and thereafter is further shifted to the objective side so that astigmatism is balanced in the positive sense and concurrently the second group is operatively associated therewith to be shifted toward the object side so that high magnification photographing is possible and sufficiently satisfactory imaging performance is obtainable.

Embodiments of the present invention are illustrated in the following.

First embodiment shows a very compact lens system having a focal distance of $f = 100 \sim 300$ and a brightness of F-number of 4.5, as shown in the lens arrangement in FIG. 1A. A forward group $G_{41}$ in fourth group $G_4$ consists of, in the order from the object side, a positive lens $L_{41}$ having the surface of sharper curvature directed toward the object side, a positive lens $L_{42}$ having the surface of sharper curvature directed toward the image side and a negative lens $L_{43}$ having the surface of sharper curvature directed toward the object side. The first embodiment realizes lens arrangement having greater aperture ratio and the compactness at a time. Specifically, the forward group $G_{41}$ in the fourth group has a degree of freedom in which zonal spherical aberration, Petzval sum and astigmatism are corrected at one time. It was found that such a correction of aberration is sufficiently possible by this number of lenses. By that a shape factor $q_{43}$ of the negative lens $L_{43}$ satisfies the condition $0.5 < q_{43} < 1.5$ it is possible to make the fourth group compacter. It is noted that a shape factor $q$ is defined by $q = [(R_2 + R_1)/(R_2 - R_1)]$ wherein $R_1$ and $R_2$ represent radii of curvature at the object side and at image side of the lens, respectively. If the upper limit of this condition is exceeded, excessively positive spherical aberration and extroversive coma produce and this is undesirable. If the lower limit is exceeded, excessively negative spherical aberration and extroversive coma produce undesirably. In order to attain the compactness and greater aperture ratio of the lens at one time, it is desirable that refractive index of second positive lens $L_{42}$ in the forward group, designated by $n_{11}$, satisfies the condition $1.4 < n_{11} < 1.7$.

If the upper limit of this condition is exceeded, it becomes difficult to correct zonal spherical aberration and Petzval sum. If the lower limit is exceeded, the curvature of the positive lens $L_{42}$ at the image side is too sharp and high-order spherical aberration produces and chromatic aberration of spherical aberration creates excessively. This is undesirable. The zonal spherical aberration can be corrected by making larger air space between the second positive lens $L_{42}$ and a negative lens $L_{43}$ in this forward group $G_{41}$. It is desirable to satisfy the condition that $0.005 < d_{18}/f_4 < 0.3$. If the upper limit of this condition is exceeded, high-order spherical aberration produces undesirably. If the lower limit is exceeded, a degree of freedom in which the zonal spherical aberration is corrected is undesirably decreased.

Figure 3A:
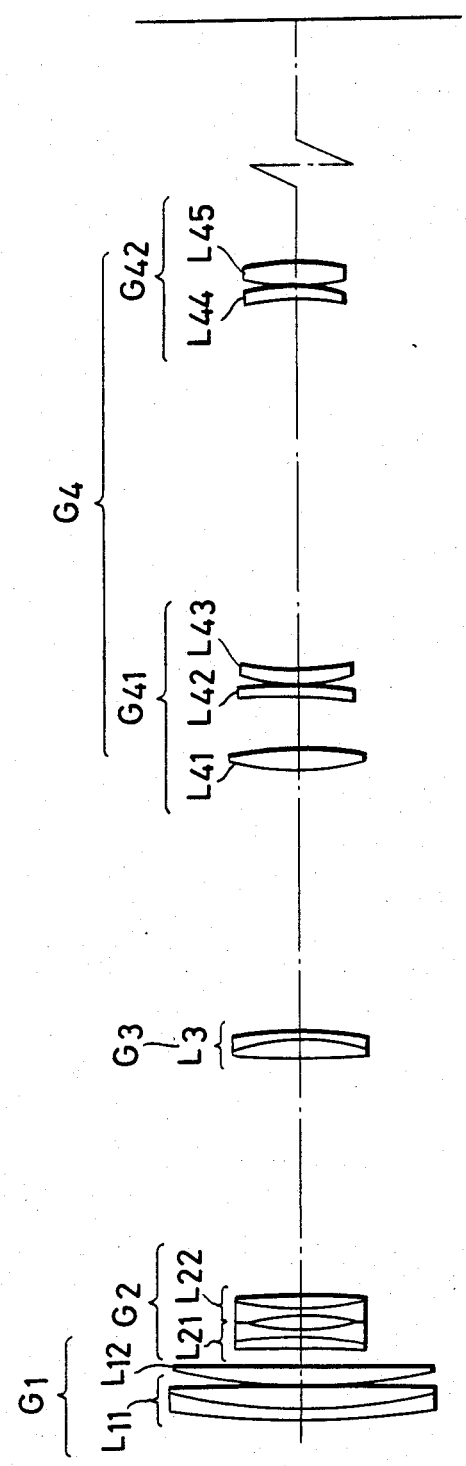
Figure 3B:
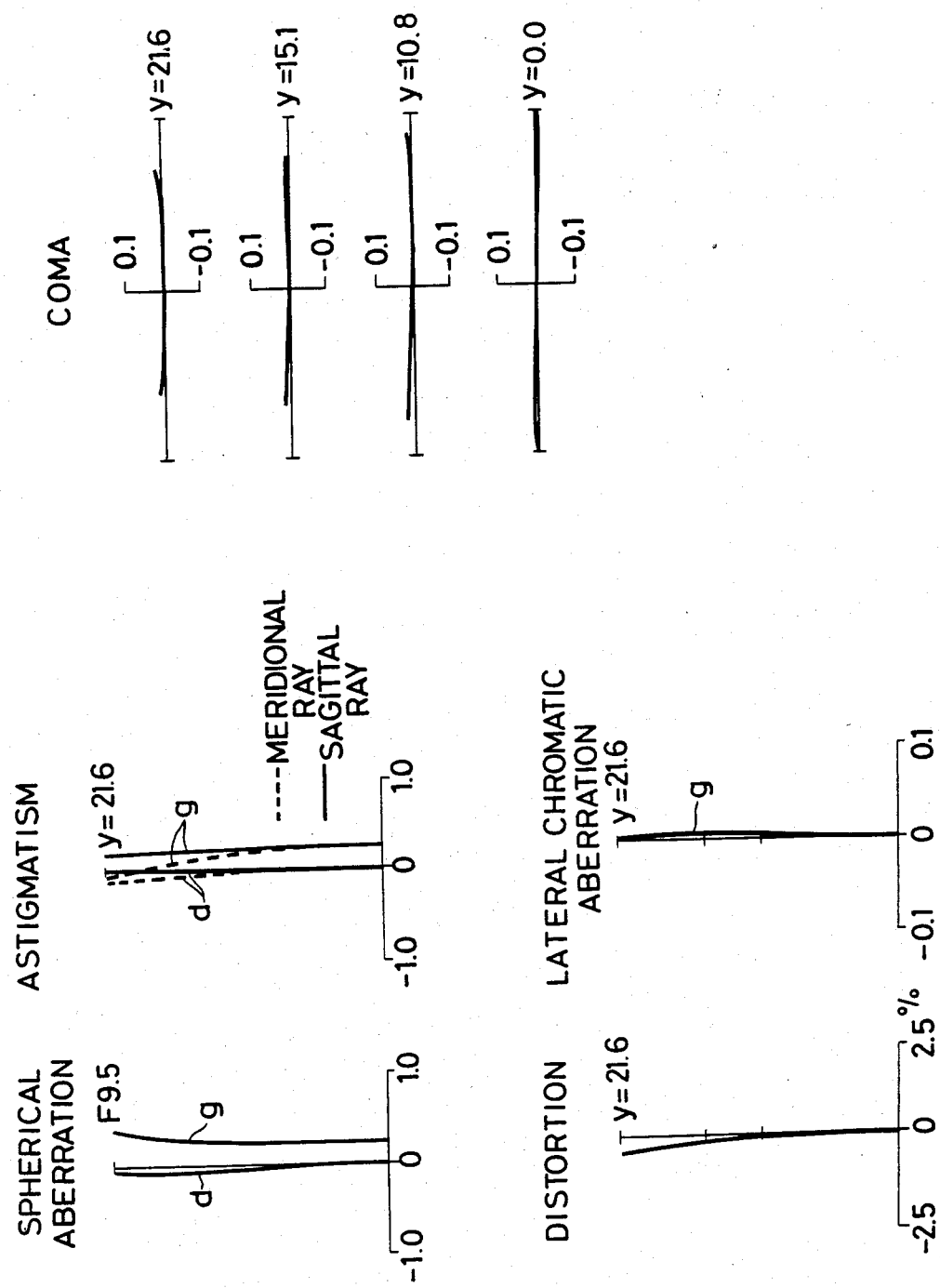
Figure 3C:
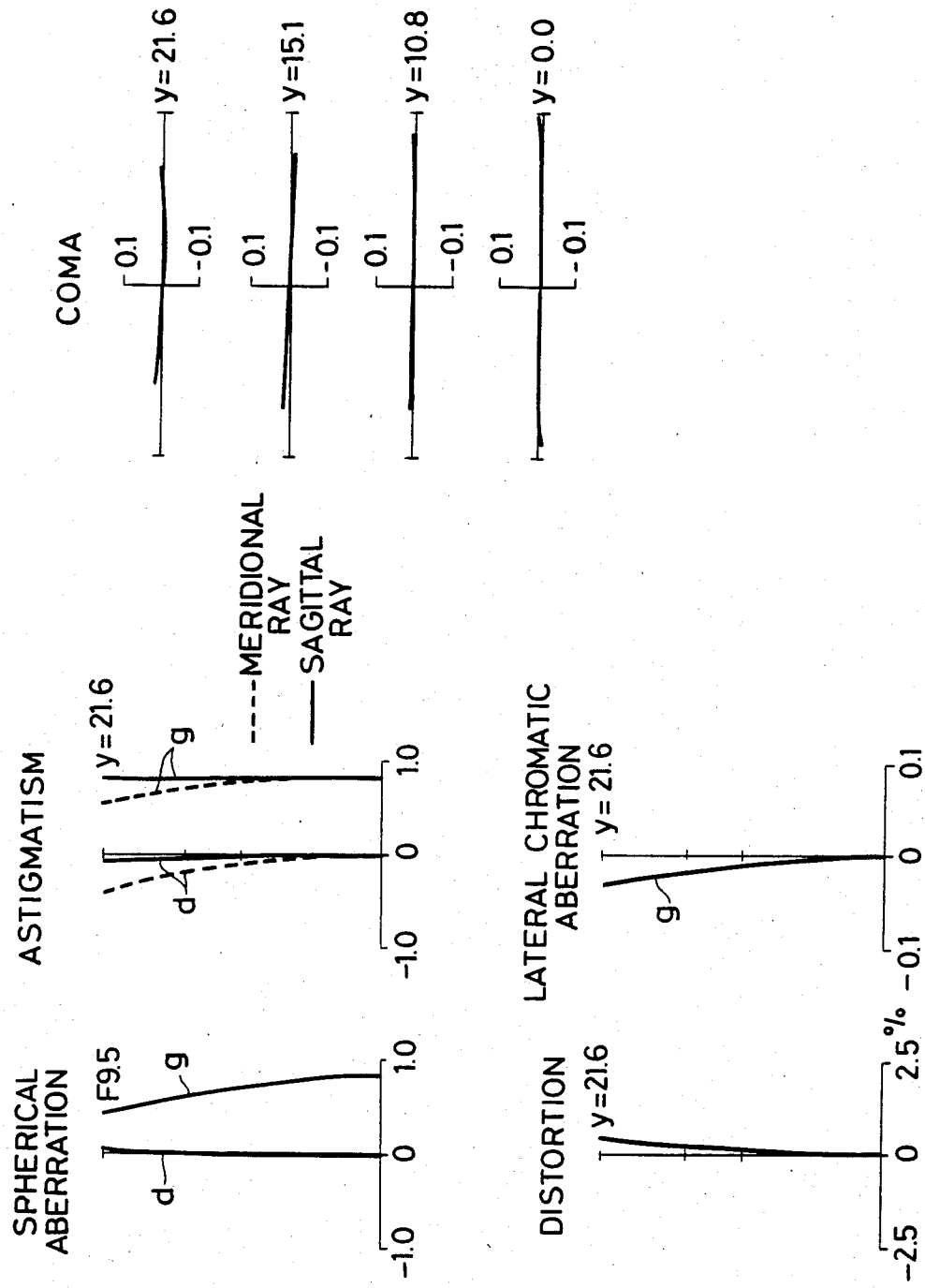

The lens construction of a second embodiment is shown in FIG. 2A in which the focal length $f$ is 102 to 294.78 and the F-number is 5.6. A third embodiment whose lens construction is shown in FIG. 3A is of a telephoto zoom lens whose focal length $f$ is 200 to 596.0 and F-number is 9.5. In these second and third embodiments, a fourth group $G_4$ as relay system is composed of a forward group $G_{41}$ consisting of a biconvex positive lens $L_{41}$, a negative meniscus lens $L_{42}$ having the surface of sharper curvature directed toward the object side and a positive meniscus lens $L_{43}$ having the surface of sharper curvature directed toward the object side and a rearward group $G_{42}$ consisting of a negative meniscus lens $L_{44}$ having the surface convex toward the object side and a biconvex positive lens $L_{45}$. In the second embodiment, a telephoto ratio (which is a ratio of a distance from foremost lens surface to the focal point with a focal distance) relative to the longest focal distance is 0.8, while in the third embodiment, a telephoto ratio is 0.69. The second and third embodiments is of very compact structure. If a composite focal distance as front group $G_{41}$ of the fourth group is designated by $f_{41}$ and a composite focal distance of the fourth group is designated by $f_4$, a relation of $f_{41}$ and $f_4$ is desirably $0.6 < f_{41}/f_4 < 0.8$. If the upper limit of this condition is exceeded, the length of the fourth group is too long and the compactness becomes difficult. If the lower limit is exceeded, it is undesirably difficult to correct spherical aberration, Petzval sum, astigmatism and coma.

It is noted that in the third embodiment, high-performance extra telephoto zoom lens is realized without the use of so-called anomalous dispersion glass in the first group.

Figure 5C:
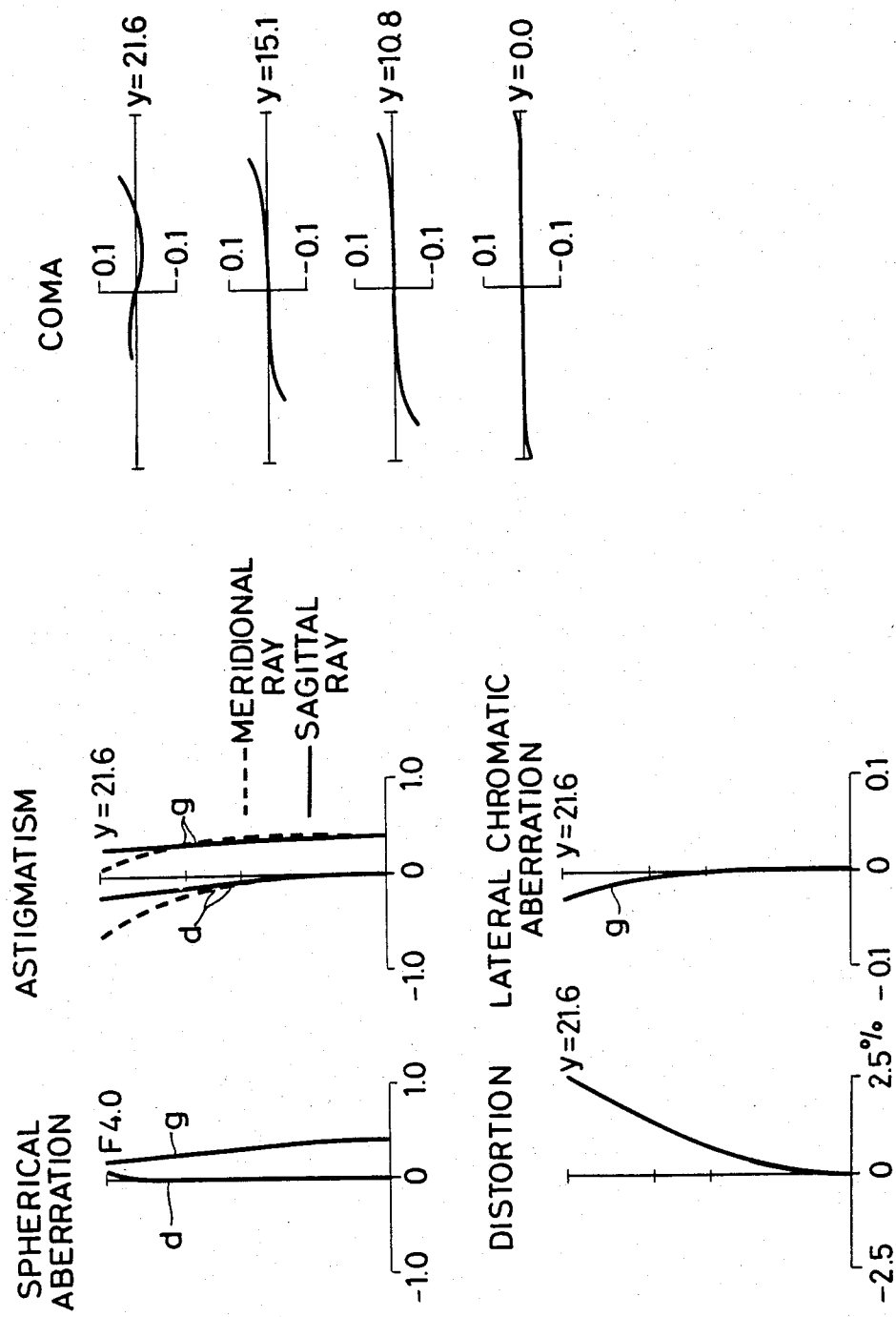
Figure 6A:
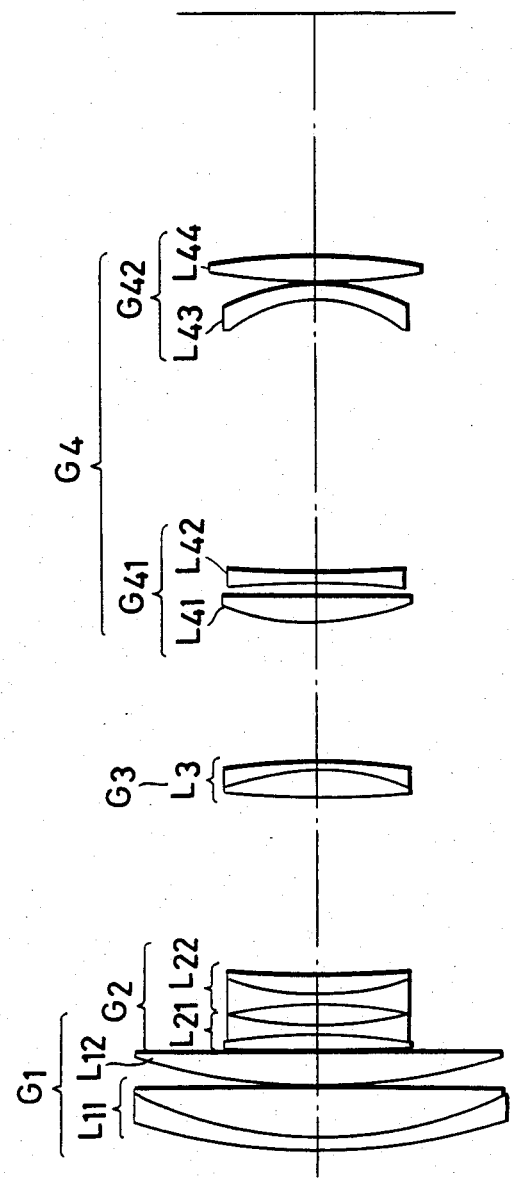

In fourth, fifth and sixth embodiments whose lens constructions are shown in FIGS. 4A, 5A and 6A, the focal distance of each of embodiments is $f=70-210$, $f=70-208$ and $f=70-210$ and F-number is the same, −4.0. In these embodiments, a shape factor $q_{12}$ of a positive lens $L_{12}$ at the image side in the first group $G_1$ more desirably satisfies the condition, $0.8 < q_{12} < 0.95$. At the long focal distance side, if the upper limit of the condition is exceeded, both spherical aberration and astigmatism are excessively positive, while if the lower limit is exceeded, both spherical aberration and astigmatism are excessively negative. The both cases are undesirable. If the range of the above condition is exceeded, variation in spherical aberration and astigmatism at short distance side is undesirably excessive in the above-noted specification.

Numerical data in each of embodiments according to the present invention are shown in the following Tables. In each of the tables, $r_1$, $r_2$, $r_3$, ... represent radii of curvature of each lens surface in succession from the object side; $d_1$, $d_2$, $d_3$, ... represent center thicknesses of each lens and air spaces between lenses; $n_1$, $n_2$, $n_3$, ... represent refractive indexes of each lens for d-line ($\lambda = 587.6$ nm), $\nu_1$, $\nu_2$, $\nu_3$, ... represent Abbe numbers of each lens; Bf represents back focal distance; $f_1$, $f_2$, $f_3$ and $f_4$ represent the focal distances of first, second, third, fourth groups, respectively; $f_{11}$ and $f_{12}$ represent focal distances of a cemented positive lens and a positive lens, respectively, in the first group; $f_{21}$ and $f_{22}$ represent focal distances of first cemented negative lens component and second cemented negative lens component, respectively, in the second group; and $f_{41}$ represents focal distance of front group in the fourth group.

First Embodiment

Focal distance F = 100~300  F-number 4.5  Half angle of view $\omega = 12.4° \sim 4.1°$

| | | | | | | |
|---|---|---|---|---|---|---|
| $r_1 = 138.082$ | $d_1 = 2.0$ | $n_1 = 1.75520$ | $\nu_1 = 27.64$ | $L_{11}$ | | |
| $r_2 = 78.651$ | $d_2 = 9.8$ | $n_2 = 1.48749$ | $\nu_2 = 70.24$ | | | |
| $r_3 = -3525.0$ | $d_3 = 0.2$ | | | | $G_1$ | |
| $r_4 = 114.236$ | $d_4 = 7.2$ | $n_3 = 1.48749$ | $\nu_3 = 70.24$ | $L_{12}$ | | |
| $r_5 = -880.949$ | $d_5 = 1.832 \sim 61.287$ | | | | | |
| $r_6 = -900.120$ | $d_6 = 3.2$ | $n_4 = 1.75520$ | $\nu_4 = 27.64$ | $L_{21}$ | | |
| $r_7 = -88.996$ | $d_7 = 1.25$ | $n_5 = 1.77279$ | $\nu_5 = 49.44$ | | $G_2$ | |
| $r_8 = 61.688$ | $d_8 = 5.3$ | | | | | |
| $r_9 = -65.175$ | $d_9 = 1.25$ | $n_6 = 1.6516$ | $\nu_6 = 58.54$ | $L_{22}$ | | |
| $r_{10} = 50.990$ | $d_{10} = 4.1$ | $n_7 = 1.80518$ | $\nu_7 = 25.36$ | | | |
| $r_{11} = 277.551$ | $d_{11} = 38.297 \sim 0.476$ | | | | | |
| $r_{12} = 167.997$ | $d_{12} = 7.0$ | $n_8 = 1.67003$ | $\nu_8 = 47.05$ | $L_3$-$G_3$ | | |
| $r_{13} = -39.623$ | $d_{13} = 1.0$ | $n_9 = 1.80518$ | $\nu_9 = 25.36$ | | | |
| $r_{14} = -90.872$ | $d_{14} = 27.493 \sim 5.86$ | | | | | |
| $r_{15} = 51.820$ | $d_{15} = 5.5$ | $n_{10} = 1.69350$ | $\nu_{10} = 53.76$ | $L_{41}$ | | |
| $r_{16} = 301.883$ | $d_{16} = 5.5$ | | | | | |
| $r_{17} = -200.049$ | $d_{17} = 4$ | $n_{11} = 1.50137$ | $\nu_{11} = 56.46$ | $L_{42}$ | $G_{41}$ | |
| $r_{18} = -75.908$ | $d_{18} = 2$ | | | | | |
| $r_{19} = -82.508$ | $d_{19} = 2.4$ | $n_{12} = 1.75520$ | $\nu_{12} = 27.64$ | $L_{43}$ | | $G_4$ |
| $r_{20} = -1103.510$ | $d_{20} = 60.5$ | | | | | |
| $r_{21} = -27.353$ | $d_{21} = 2.5$ | $n_{13} = 1.79668$ | $\nu_{13} = 45.52$ | $L_{44}$ | $G_{42}$ | |
| $r_{22} = -49.162$ | $d_{22} = 0.2$ | | | | | |
| $r_{23} = 130.036$ | $d_{23} = 4$ | $n_{14} = 1.62004$ | $\nu_{14} = 36.34$ | $L_{45}$ | | |
| $r_{24} = -141.516$ | Bf = 59.175 | | | | | |

$f_1 = 144.355$  $f_{11} = 450.007$  $f_{12} = 207.929$
$f_2 = -41.0667$  $f_{21} = -73.569$  $f_{22} = -100.687$
$f_3 = 107.022$
$f_4 = 161$  $f_{41} = 132.257$

Second Embodiment

Focal distance F = 102~294.784  F-number 5.6  Half angle of view $\omega = 12.2° \sim 4.1°$

| | | | | |
|---|---|---|---|---|
| $r_1 = 249.101$ | $d_1 = 2.0$ | $n_1 = 1.71736$ | $\nu_1 = 29.48$ | $L_{11}$ |
| $r_2 = 90.100$ | $d_2 = 7.5$ | $n_2 = 1.48749$ | $\nu_2 = 70.24$ | |

-continued

Second Embodiment

Focal distance F = 102~294.784     F-number 5.6     Half angle of view $\omega = 12.2° \sim 4.1°$

| | | | | |
|---|---|---|---|---|
| $r_3 = -279.981$ | $d_3 = 0.2$ | | | $\left.\begin{array}{l}\\ \\ \end{array}\right\} G_1$ |
| $r_4 = 83.989$ | $d_4 = 6.5$ | $n_3 = 1.48749$  $\nu_3 = 70.24$ | $L_{12}$ | |
| $r_5 = 3244.260$ | $d_5 = 1.211 \sim 53.511$ | | | |
| $r_6 = -543.380$ | $d_6 = 3.0$ | $n_4 = 1.80518$  $\nu_4 = 25.36$ | $\left.\begin{array}{l}\\ \end{array}\right\} L_{21}$ | |
| $r_7 = -59.953$ | $d_7 = 1.0$ | $n_5 = 1.71700$  $\nu_5 = 48.12$ | | $\left.\begin{array}{l}\\ \\ \\ \end{array}\right\} G_2$ |
| $r_8 = 56.327$ | $d_8 = 4.5$ | | | |
| $r_9 = -58.963$ | $d_9 = 1.0$ | $n_6 = 1.71300$  $\nu_6 = 53.97$ | $\left.\begin{array}{l}\\ \end{array}\right\} L_{22}$ | |
| $r_{10} = 66.292$ | $d_{10} = 2.7$ | $n_7 = 1.80518$  $\nu_7 = 25.36$ | | |
| $r_{11} = 643.454$ | $d_{11} = 37.463 \sim 1.061$ | | | |
| $r_{12} = 108.117$ | $d_{12} = 6.0$ | $n_8 = 1.51835$  $\nu_8 = 60.34$ | $\left.\begin{array}{l}\\ \end{array}\right\} L_3\text{-}G_3$ | |
| $r_{13} = -36.400$ | $d_{13} = 1.0$ | $n_9 = 1.71736$  $\nu_9 = 29.48$ | | |
| $r_{14} = -68.495$ | $d_{14} = 23.112 \sim 7.214$ | | | |
| $r_{15} = 59.608$ | $d_{15} = 4.5$ | $n_{10} = 1.50137$  $\nu_{10} = 56.46$ | $L_{41}$ | |
| $r_{16} = -89.577$ | $d_{16} = 7.5$ | | | |
| $r_{17} = -65.081$ | $d_{17} = 1.5$ | $n_{11} = 1.71736$  $\nu_{11} = 29.48$ | $L_{42}$  $\left.\begin{array}{l}\\ \end{array}\right\} G_{41}$ | |
| $r_{18} = -3218.000$ | $d_{18} = 0.2$ | | | |
| $r_{19} = 29.949$ | $d_{19} = 4.9$ | $n_{12} = 1.51680$  $\nu_{12} = 64.12$ | $L_{43}$ | $\left.\begin{array}{l}\\ \\ \\ \end{array}\right\} G_4$ |
| $r_{20} = 31.637$ | $d_{20} = 49$ | | | |
| $r_{21} = -20.200$ | $d_{21} = 1.5$ | $n_{13} = 1.71300$  $\nu_{13} = 53.97$ | $L_{44}$  $\left.\begin{array}{l}\\ \end{array}\right\} G_{42}$ | |
| $r_{22} = -46.508$ | $d_{22} = 0.2$ | | | |
| $r_{23} = 184.131$ | $d_{23} = 3.5$ | $n_{14} = 1.57501$  $\nu_{14} = 41.55$ | $L_{45}$ | |
| $r_{24} = -49.324$ | $Bf = 67.047$ | | | |

$f_1 = 129.910$  $f_{11} = 483.225$  $f_{12} = 176.748$
$f_2 = -39.246$  $f_{21} = -78.321$  $f_{22} = -83.527$
$f_3 = 102.999$
$f_4 = 164.790$  $f_{41} = 124.449$

Third Embodiment

Focal distance F = 200~596     F-number 9.5     Half angle of view $\omega = 6.2° \sim 2.1°$

| | | | | |
|---|---|---|---|---|
| $r_1 = 300.0$ | $d_1 = 2.5$ | $n_1 = 1.75520$  $\nu_1 = 27.64$ | $\left.\begin{array}{l}\\ \end{array}\right\} L_{11}$ | |
| $r_2 = 145.035$ | $d_2 = 6.0$ | $n_2 = 1.51680$  $\nu_2 = 64.12$ | | $\left.\begin{array}{l}\\ \\ \end{array}\right\} G_1$ |
| $r_3 = 10000.0$ | $d_3 = 0.1$ | | | |
| $r_4 = 207.952$ | $d_4 = 5.0$ | $n_3 = 1.51680$  $\nu_3 = 64.12$ | $L_{12}$ | |
| $r_5 = -1332.443$ | $d_5 = 4.856 \sim 126.845$ | | | |
| $r_6 = -699.412$ | $d_6 = 3.0$ | $n_4 = 1.7552$  $\nu_4 = 27.64$ | $\left.\begin{array}{l}\\ \end{array}\right\} L_{21}$ | |
| $r_7 = -147.0$ | $d_7 = 2.0$ | $n_5 = 1.76684$  $\nu_5 = 46.76$ | | $\left.\begin{array}{l}\\ \\ \end{array}\right\} G_2$ |
| $r_8 = 108.126$ | $d_8 = 3.0$ | | | |
| $r_9 = -117.455$ | $d_9 = 2.0$ | $n_6 = 1.69680$  $\nu_6 = 55.61$ | $\left.\begin{array}{l}\\ \end{array}\right\} L_{22}$ | |
| $r_{10} = 86.530$ | $d_{10} = 3.0$ | $n_7 = 1.80518$  $\nu_7 = 25.36$ | | |
| $r_{11} = 3180.161$ | $d_{11} = 61.706 \sim 1.044$ | | | |
| $r_{12} = 270.0$ | $d_{12} = 4.5$ | $n_8 = 1.62280$  $\nu_8 = 57.03$ | $\left.\begin{array}{l}\\ \end{array}\right\} L_3\text{-}G_3$ | |
| $r_{13} = -63.608$ | $d_{13} = 1.8$ | $n_9 = 1.7552$  $\nu_9 = 27.64$ | | |
| $r_{14} = -137.0$ | $d_{14} = 67.463 \sim 6.136$ | | | |
| $r_{15} = 84.416$ | $d_{15} = 4.5$ | $n_{10} = 1.48749$  $\nu_{10} = 70.24$ | $L_{41}$ | |
| $r_{16} = -218.730$ | $d_{16} = 14.3$ | | | |
| $r_{17} = -135.948$ | $d_{17} = 2.5$ | $n_{11} = 1.80454$  $\nu_{11} = 39.59$ | $L_{42}$  $\left.\begin{array}{l}\\ \end{array}\right\} G_{41}$ | |
| $r_{18} = -8260.0$ | $d_{18} = 0.2$ | | | |
| $r_{19} = 48.395$ | $d_{19} = 4$ | $n_{12} = 1.51680$  $\nu_{12} = 64.12$ | $L_{43}$ | $\left.\begin{array}{l}\\ \\ \end{array}\right\} G_4$ |
| $r_{20} = 59.585$ | $d_{20} = 94.5$ | | | |
| $r_{21} = -34.560$ | $d_{21} = 2.5$ | $n_{13} = 1.76684$  $\nu_{13} = 46.76$ | $L_{44}$  $\left.\begin{array}{l}\\ \end{array}\right\} G_{42}$ | |
| $r_{22} = -93.110$ | $d_{22} = 0.2$ | | | |
| $r_{23} = 300.0$ | $d_{23} = 5$ | $n_{14} = 1.62588$  $\nu_{14} = 35.64$ | $L_{45}$ | |
| $r_{24} = -90.220$ | $Bf = 116.562$ | | | |

$f_1 = 272$  $f_{11} = 1207.48$  $f_{12} = 348.448$
$f_2 = -75$  $f_{21} = -120.867$  $f_{22} = -202.916$
$f_3 = 175$
$f_4 = 315$  $f_{41} = 203.298$

Fourth Embodiment

Focal distance F = 70~210     F-number 4.0     Half angle of view $\omega = 17.8° \sim 5.7°$

| | | | | |
|---|---|---|---|---|
| $r_1 = 127.282$ | $d_1 = 1.6$ | $n_1 = 1.80518$  $\nu_1 = 25.36$ | $\left.\begin{array}{l}\\ \end{array}\right\} L_{11}$ | |
| $r_2 = 70.8$ | $d_2 = 8.5$ | $n_2 = 1.51680$  $\nu_2 = 64.12$ | | $\left.\begin{array}{l}\\ \\ \end{array}\right\} G_1$ |
| $r_3 = -1000.0$ | $d_3 = 0.1$ | | | |
| $r_4 = 92.0$ | $d_4 = 6.5$ | $n_3 = 1.51680$  $\nu_3 = 64.12$ | $L_{12}$ | |

-continued

Fourth Embodiment

Focal distance F = 70~210  F-number 4.0  Half angle of view ω = 17.8°~5.7°

| | | | | |
|---|---|---|---|---|
| $r_5 = -1503.739$ | $d_5 = 1.334~48.813$ | | | |
| $r_6 = -914.793$ | $d_6 = 2.8$ | $n_4 = 1.75520$  $\nu_4 = 27.64$ | } $L_{21}$ | } $G_2$ |
| $r_7 = -78.0$ | $d_7 = 1.0$ | $n_5 = 1.77279$  $\nu_5 = 49.44$ | | |
| $r_8 = 50.4$ | $d_8 = 4.2$ | | | |
| $r_9 = -53.551$ | $d_9 = 1.0$ | $n_6 = 1.65160$  $\nu_6 = 58.54$ | } $L_{22}$ | |
| $r_{10} = 40.0$ | $d_{10} = 3.5$ | $n_7 = 1.80518$  $\nu_7 = 25.36$ | | |
| $r_{11} = 181.772$ | $d_{11} = 30.664~0.082$ | | | |
| $r_{12} = 135.0$ | $d_{12} = 5.2$ | $n_8 = 1.65844$  $\nu_8 = 50.84$ | } $L_2$-$G_3$ | |
| $r_{13} = -33.3$ | $d_{13} = 1.2$ | $n_9 = 1.80518$  $\nu_9 = 25.36$ | | |
| $r_{14} = -71.469$ | $d_{14} = 23.204~6.307$ | | | |
| $r_{15} = 35.2$ | $d_{15} = 5.3$ | $n_{10} = 1.62041$  $\nu_{10} = 60.35$ | $L_{41}$ | } $G_{41}$ |
| $r_{16} = -366.262$ | $d_{16} = 1.9$ | | | |
| $r_{17} = -204.0$ | $d_{17} = 2.0$ | $n_{11} = 1.80518$  $\nu_{11} = 25.36$ | $L_{42}$ | } $G_4$ |
| $r_{18} = 516.558$ | $d_{18} = 46.6$ | | | |
| $r_{19} = -20.0$ | $d_{19} = 2.3$ | $n_{12} = 1.77279$  $\nu_{12} = 49.44$ | $L_{43}$ | } $G_{42}$ |
| $r_{20} = -36.519$ | $d_{20} = 0.2$ | | | |
| $r_{21} = 82.964$ | $d_{21} = 5$ | $n_{13} = 1.51454$  $\nu_{13} = 54.62$ | $L_{44}$ | |
| $r_{22} = -89.580$ | $Bf = 40.953$ | | | |

$f_1 = 116$       $f_{11} = 359.322$       $f_{12} = 167.988$
$f_2 = -33$       $f_{21} = -60.924$      $f_{22} = -77.921$
$f_3 = 86$
$f_4 = 112$       $f_{41} = 90.663$

Fifth Embodiment

Focal distance F = 70~210  F-number 4.0  Half angle of view ω = 17.8°~5.8°

| | | | | |
|---|---|---|---|---|
| $r_1 = 127.5$ | $d_1 = 1.6$ | $n_1 = 1.80518$  $\nu_1 = 25.36$ | } $L_{11}$ | } $G_1$ |
| $r_2 = 71.0$ | $d_2 = 8.5$ | $n_2 = 1.51680$  $\nu_2 = 64.12$ | | |
| $r_3 = -1005.0$ | $d_3 = 0.1$ | | | |
| $r_4 = 90.5$ | $d_4 = 6.5$ | $n_3 = 1.51680$  $\nu_3 = 64.12$ | $L_{12}$ | |
| $r_5 = -2073.761$ | $d_5 = 1.494~48.745$ | | | |
| $r_6 = -2601.874$ | $d_6 = 2.8$ | $n_4 = 1.72825$  $\nu_4 = 28.34$ | } $L_{21}$ | |
| $r_7 = -70.0$ | $d_7 = 1.0$ | $n_5 = 1.80411$  $\nu_5 = 46.43$ | | } $G_2$ |
| $r_8 = 49.8$ | $d_8 = 4.2$ | | | |
| $r_9 = -52.746$ | $d_9 = 1.0$ | $n_6 = 1.65160$  $\nu_6 = 58.54$ | } $L_{22}$ | |
| $r_{10} = 40.0$ | $d_{10} = 3.5$ | $n_7 = 1.80518$  $\nu_7 = 25.36$ | | |
| $r_{11} = 249.655$ | $d_{11} = 30.171~0.026$ | | | |
| $r_{12} = 150.0$ | $d_{12} = 5.5$ | $n_8 = 1.67003$  $\nu_8 = 47.05$ | } $L_2$-$G_3$ | |
| $r_{13} = -29.0$ | $d_{13} = 1.2$ | $n_9 = 1.80518$  $\nu_9 = 25.36$ | | |
| $r_{14} = -67.507$ | $d_{14} = 23.292~6.187$ | | | |
| $r_{15} = 37.5$ | $d_{15} = 5.3$ | $n_{10} = 1.6516$  $\nu_{10} = 58.54$ | $L_{41}$ | } $G_{41}$ |
| $r_{16} = -421.165$ | $d_{16} = 1.9$ | | | |
| $r_{17} = -1000.0$ | $d_{17} = 2.0$ | $n_{11} = 1.80518$  $\nu_{11} = 25.36$ | $L_{42}$ | } $G_4$ |
| $r_{18} = 178.882$ | $d_{18} = 46.6$ | | | |
| $r_{19} = -20.6$ | $d_{19} = 2.3$ | $n_{12} = 1.77279$  $\nu_{12} = 49.44$ | $L_{43}$ | } $G_{42}$ |
| $r_{20} = -38.184$ | $d_{20} = 0.2$ | | | |
| $r_{21} = 100.0$ | $d_{21} = 5.0$ | $n_{13} = 1.50137$  $\nu_{13} = 56.46$ | $L_{44}$ | |
| $r_{22} = -72.537$ | $Bf = 41.084$ | | | |

$f_1 = 116.0$      $f_{11} = 359.586$      $f_{12} = 167.965$
$f_2 = -33$        $f_{21} = -57.044$      $f_{22} = -84.834$
$f_3 = 86$
$f_4 = 112$        $f_{41} = 90.90377$

Sixth Embodiment

Focal distance F = 70~210  F-number 4.0  Half angle of view ω = 17.8°~5.7°

| | | | | |
|---|---|---|---|---|
| $r_1 = 102.056$ | $d_1 = 2.0$ | $n_1 = 1.80491$  $\nu_1 = 25.36$ | } $L_{11}$ | } $G_1$ |
| $r_2 = 65.2$ | $d_2 = 9.0$ | $n_2 = 1.48741$  $\nu_2 = 70.24$ | | |
| $r_3 = -1440.0$ | $d_3 = 0.1$ | | | |
| $r_4 = -96.0$ | $d_4 = 6.0$ | $n_3 = 1.48744$  $\nu_3 = 70.24$ | $L_{12}$ | |
| $r_5 = -1555.673$ | $d_5 = 0.486~47.965$ | | | |
| $r_6 = -914.793$ | $d_6 = 2.8$ | $n_4 = 1.75520$  $\nu_4 = 27.64$ | } $L_{21}$ | |
| $r_7 = -73.0$ | $d_7 = 1.0$ | $n_5 = 1.77279$  $\nu_5 = 49.44$ | | } $G_2$ |
| $r_8 = 51.0$ | $d_8 = 4.2$ | | | |
| $r_9 = -53.7$ | $d_9 = 1.0$ | $n_6 = 1.65160$  $\nu_6 = 58.54$ | | |

-continued

Sixth Embodiment

Focal distance F = 70~210　　F-number 4.0　　Half angle of view ω = 17.8°~5.7°

| | | | |
|---|---|---|---|
| $r_{10} = 40.0$ | $d_{10} = 3.5$ | $n_7 = 1.80518$　$\nu_7 = 25.36$ | } $L_{22}$ |
| $r_{11} = 174.433$ | $d_{11} = 30.764$~0.183 | | |
| $r_{12} = 130.0$ | $d_{12} = 5.2$ | $n_8 = 1.65844$　$\nu_8 = 50.84$ | } $L_3$-$G_3$ |
| $r_{13} = -33.0$ | $d_{13} = 1.2$ | $n_9 = 1.80518$　$\nu_9 = 25.36$ | |
| $r_{14} = -72.663$ | $d_{14} = 23.143$~6.246 | | |
| $r_{15} = 36.1$ | $d_{15} = 5.3$ | $n_{10} = 1.62041$　$\nu_{10} = 60.35$ | $L_{41}$ |
| $r_{16} = -506.153$ | $d_{16} = 1.9$ | | |
| $r_{17} = -210.0$ | $d_{17} = 2.0$ | $n_{11} = 1.80518$　$\nu_{11} = 25.36$ | $L_{42}$ |
| $r_{18} = 481.790$ | $d_{18} = 46.6$ | | |
| $r_{19} = -20.350$ | $d_{19} = 2.3$ | $n_{12} = 1.76684$　$\nu_{12} = 46.76$ | $L_{43}$ |
| $r_{20} = -37.829$ | $d_{20} = 0.2$ | | |
| $r_{21} = 95.0$ | $d_{21} = 5.0$ | $n_{13} = 1.53172$　$\nu_{13} = 49.14$ | $L_{44}$ |
| $r_{22} = -83.305$ | Bf = 41.210 | | |
| | $f_1 = 116$ | $f_{11} = 295.061$ | $f_{12} = 185.721$ |
| | $f_2 = -33$ | $f_{21} = -61.544$ | $f_{22} = -76.981$ |
| | $f_3 = 86$ | | |
| | $f_4 = 112$ | $f_{41} = 90.7116$ | |

Various aberration graphs of first to sixth embodiments are shown in FIGS. 1B, 1C to FIGS. 6B, 6C, respectively. FIGS. 1B, 2B, 3B, 4B, 5B and 6B show states of the shortest focal distance and FIGS. 1C, 2C, 3C, 4C, 5C and 6C show states of the longest focal distance. In each of FIGS. 1B, 1C to 6B, 6C spherical aberration, astigmatism, distortion, lateral chromatic aberration for g-line (λ=435.8 mm) and coma.

It is obvious from each of aberration graphs that any embodiment is of compact structure and yet an excellent imaging performance is maintained at condition of each of focal distances.

The present invention is aimed at the compactness of the whole of lens system. However, if a large size of the whole is allowed to a certain degree, it is possible to realize a great aperture ratio zoom lens having the brightness of F-number of 2.8 or so. It is easily possible to increase a degree of freedom for aberration correction to provide better imaging performance by adding another lens to a structure as the fourth group shown in each of embodiments. In order to make smaller lens aperture of a final lens, it is also effective to arrange a positive lens before the rearward group $G_{42}$ in the fourth group. In this case, it is possible to displace distortion in the positive direction over the entire variable power range.

In the foregoing statement, according to the present invention, four-group telephoto zoom lens is completed which has a compact structure and yet having an excellent imaging performance over the entire variable power range.

What is claimed is:

1. A four-group telephoto zoom lens consisting of, in succession from the object side, first group having a positive refracting power and movable on the optical axis of the lens for focusing, second group having a negative refracting power and movable on the optical axis for changing a composite focal distance of an entire system, a third group having a positive refracting power and movable on the optical axis for maintaining image plane at a fixed position and a fourth group as relay lens system having a positive refracting power, the improvement wherein said second group consists of a first cemented negative lens component having in the order from the object side a positive lens and a negative lens cemented together and a second cemented negative lens component having a negative lens and a positive lens cemented together and the improvement satisfying the conditions:

$$0.5 < f_{21}/f_{22} < 1.0$$

$$1.5 < f_{21}/f_2 < 2.1$$

$$2.0 < f_{22}/f_2 < 2.8$$

$$-0.09 < n_4 - n_5 < 0.09$$

$$0.09 < n_7 - n_6 < 0.2$$

wherein $f_{21}$ and $f_{22}$ represent focal distance of said first and second cemented negative lens components, respectively, in said second group; $f_2$ represents a composite focal distance of said second group; $n_4$ and $n_5$ represent refractive indexes of the positive lens and the negative lens, respectively, in said first negative lens component; and $n_6$ and $n_7$ represent refractive indexes of the negative lens and the positive lens, respectively, in said second lens component.

2. A telephoto zoom lens according to claim 1, wherein said first group includes a cemented positive lens component having, in succession from the object side, a negative lens and a positive lens cemented together and having the surface of sharper curvature directed toward the object side, and a positive lens component having the surface of sharper curvature directed toward the object side.

3. A telephoto zoom lens according to claim 2, satisfying the condition:

$$1.5 < f_{11}/f_{12} < 3.5$$

wherein $f_{11}$ represents a focal distance of a cemented positive lens component at the object side in said first group and $f_{12}$ represents a focal distance of a positive lens component at the image side.

4. A telephoto zoom lens according to claim 3, satisfying the conditions:

$$1.25 < f_{12}/f_1 < 1.65,\ 1.45 < n_2 < 1.68$$

wherein $f_{12}$ represents a focal distance of the positive lens component at the image side in said first group and $n_2$ represents a refractive index of a positive lens in the cemented positive lens component.

5. A telephoto zoom lens according to claim 1, wherein said fourth group includes a forward group having, in succession from the object side, a positive lens having the surface of sharper curvature directed toward the object side, a positive lens having the surface of sharper curvature directed toward the image side and a negative lens having the surface of sharper curvature directed toward the object side, and a rearward group having a negative meniscus lens having the surface convex toward the image side and a positive lens.

6. A telephoto zoom lens according to claim 5, wherein a shape factor $q_{43}$ of a negative lens in the forward group in said fourth group satisfies the condition:

$$0.5 < q_{43} < 1.5$$

wherein a shape factor q is defined by $q = [(R_2 + R_1)/(R_2 - R_1)]$ wherein $R_1$ and $R_2$ represent radii of curvature of a lens at the object side and at the image side, respectively.

7. A telephoto zoom lens according to claim 6, satisfying the condition, $$1.4 < n_{11} < 1.7$$

wherein $n_{11}$ represents a refractive index of a positive lens having the surface of sharper curvature directed toward the image side in the forward group in said fourth group.

8. A telephoto zoom lens according to claim 7, satisfying the condition $$0.005 < d_{18}/f_4 < 0.3$$

wherein $d_{18}$ represents air spacing between the positive lens having the surface of sharper curvature directed toward the image side in the forward group in said fourth group and the negative lens having the surface of sharper curvature directed toward the image side and $f_4$ represents the composite focal distance of said fourth group.

9. A telephoto zoom lens according to claim 8, having the numerical data as set forth in the following table:

| Focal distance F = 100~300 | | F-number 4.5 | | Half angle of view ω = 12.4°~4.1° | |
|---|---|---|---|---|---|
| $r_1 = 138.082$ | $d_1 = 2.0$ | $n_1 = 1.75520$ | $\nu_1 = 27.64$ | $L_{11}$ | |
| $r_2 = 78.651$ | $d_2 = 9.8$ | $n_2 = 1.48749$ | $\nu_2 = 70.24$ | | $G_1$ |
| $r_3 = -3525.0$ | $d_3 = 0.2$ | | | | |
| $r_4 = 114.236$ | $d_4 = 7.2$ | $n_3 = 1.48749$ | $\nu_3 = 70.24$ | $L_{12}$ | |
| $r_5 = -880.949$ | $d_5 = 1.832~61.287$ | | | | |
| $r_6 = -900.120$ | $d_6 = 3.2$ | $n_4 = 1.75520$ | $\nu_4 = 27.64$ | $L_{21}$ | |
| $r_7 = -88.996$ | $d_7 = 1.25$ | $n_5 = 1.77279$ | $\nu_5 = 49.44$ | | $G_2$ |
| $r_8 = 61.688$ | $d_8 = 5.3$ | | | | |
| $r_9 = -65.175$ | $d_9 = 1.25$ | $n_6 = 1.6516$ | $\nu_6 = 58.54$ | $L_{22}$ | |
| $r_{10} = 50.990$ | $d_{10} = 4.1$ | $n_7 = 1.80518$ | $\nu_7 = 25.36$ | | |
| $r_{11} = 277.551$ | $d_{11} = 38.297~0.476$ | | | | |
| $r_{12} = 167.997$ | $d_{12} = 7.0$ | $n_8 = 1.67003$ | $\nu_8 = 47.05$ | $L_3$-$G_3$ | |
| $r_{13} = -39.623$ | $d_{13} = 1.0$ | $n_9 = 1.80518$ | $\nu_9 = 25.36$ | | |
| $r_{14} = -90.872$ | $d_{14} = 27.493~5.86$ | | | | |
| $r_{15} = 51.820$ | $d_{15} = 5.5$ | $n_{10} = 1.69350$ | $\nu_{10} = 53.76$ | $L_{41}$ | |
| $r_{16} = 301.883$ | $d_{16} = 5.5$ | | | | |
| $r_{17} = -200.049$ | $d_{17} = 4$ | $n_{11} = 1.50137$ | $\nu_{11} = 56.46$ | $L_{42}$ | $G_{41}$ |
| $r_{18} = -75.908$ | $d_{18} = 2$ | | | | |
| $r_{19} = -82.508$ | $d_{19} = 2.4$ | $n_{12} = 1.75520$ | $\nu_{12} = 27.64$ | $L_{43}$ | |
| $r_{20} = -1103.510$ | $d_{20} = 60.5$ | | | | $G_4$ |
| $r_{21} = -27.353$ | $d_{21} = 2.5$ | $n_{13} = 1.79668$ | $\nu_{13} = 45.52$ | $L_{44}$ | $G_{42}$ |
| $r_{22} = -49.162$ | $d_{22} = 0.2$ | | | | |
| $r_{23} = 130.036$ | $d_{23} = 4$ | $n_{14} = 1.62004$ | $\nu_{14} = 36.34$ | $L_{45}$ | |
| $r_{24} = -141.516$ | Bf = 59.175 | | | | |
| $f_1 = 144.355$ | | $f_{11} = 450.007$ | | $f_{12} = 207.929$ | |
| $f_2 = -41.0667$ | | $f_{21} = -73.569$ | | $f_{22} = -100.687$ | |
| $f_3 = 107.022$ | | | | | |
| $f_4 = 161$ | | $f_{41} = 132.257$ | | | | wherein $r_1, r_2, r_3, \ldots$ represent radii of curvature of each lens surface in succession from the object side; $d_1, d_2, d_3, \ldots$ represent center thicknesses of each lens and air spaces between lenses; $n_1, n_2, n_3, \ldots$ represent refractive indexes of each lens for d-line (λ=587.6 nm); $\nu_1, \nu_2, \nu_3, \ldots$ represent Abbe numbers of each lens; Bf represents back focal distacne; $f_1, f_2, f_3$ and $f_4$ represent the focal distances of first, second, third, fourth groups, respectively; $f_{11}$ and $f_{12}$ represent focal distances of a cemented positive lens and a positive lens, respectively, in the first group; $f_{21}$ and $f_{22}$ represent focal distances of first cemented negative lens component and second cemented negative lens component, respectively, in the second group; and $f_{41}$ represents focal distance of front group in the fourth group.

10. A telephoto zoom lens according to claim 1, wherein said fourth group consists of a forward group having, in the order from the object side, a biconvex positive lens, a negative meniscus lens having the surface of sharper curvature directed toward the object side, and a positive meniscus lens having the surface of sharper curvature directed toward the object side and a rearward group having a negative meniscus lens having the surface convex toward the object side and a biconvex positive lens.

11. A telephoto zoom lens according to claim 10, satisfying the condition:

$$0.6 < f_{41}/f_4 < 0.8$$

wherein $f_{41}$ represents the total focal length of the forward group in said fourth group and $f_4$ represents the total focal distance of the fourth group.

12. A telephoto zoom lens according to claim 11, having the numerical data as set forth in the following table:

| Focal distance F = 102~294.784 | | F-number 5.6 | | Half angle of view ω = 12.2°~4.1° | | |
|---|---|---|---|---|---|---|
| $r_1 = 249.101$ | $d_1 = 2.0$ | $n_1 = 1.71736$ | $\nu_1 = 29.48$ | $L_{11}$ | | |
| $r_2 = 90.100$ | $d_2 = 7.5$ | $n_2 = 1.48749$ | $\nu_2 = 70.24$ | | $G_1$ | |
| $r_3 = -279.981$ | $d_3 = 0.2$ | | | | | |
| $r_4 = 83.989$ | $d_4 = 6.5$ | $n_3 = 1.48749$ | $\nu_3 = 70.24$ | $L_{12}$ | | |
| $r_5 = 3244.260$ | $d_5 = 1.211\sim53.511$ | | | | | |
| $r_6 = -543.380$ | $d_6 = 3.0$ | $n_4 = 1.80518$ | $\nu_4 = 25.36$ | $L_{21}$ | | |
| $r_7 = -59.953$ | $d_7 = 1.0$ | $n_5 = 1.71700$ | $\nu_5 = 48.12$ | | $G_2$ | |
| $r_8 = 56.327$ | $d_8 = 4.5$ | | | | | |
| $r_9 = -58.963$ | $d_9 = 1.0$ | $n_6 = 1.71300$ | $\nu_6 = 53.97$ | $L_{22}$ | | |
| $r_{10} = 66.292$ | $d_{10} = 2.7$ | $n_7 = 1.80518$ | $\nu_7 = 25.36$ | | | |
| $r_{11} = 643.454$ | $d_{11} = 37.463\sim1.061$ | | | | | |
| $r_{12} = 108.117$ | $d_{12} = 6.0$ | $n_8 = 1.51835$ | $\nu_8 = 60.34$ | $L_3$-$G_3$ | | |
| $r_{13} = -36.400$ | $d_{13} = 1.0$ | $n_9 = 1.71736$ | $\nu_9 = 29.48$ | | | |
| $r_{14} = -68.495$ | $d_{14} = 23.112\sim7.214$ | | | | | |
| $r_{15} = 59.608$ | $d_{15} = 4.5$ | $n_{10} = 1.50137$ | $\nu_{10} = 56.46$ | $L_{41}$ | | |
| $r_{16} = -89.577$ | $d_{16} = 7.5$ | | | | | |
| $r_{17} = -65.081$ | $d_{17} = 1.5$ | $n_{11} = 1.71736$ | $\nu_{11} = 29.48$ | $L_{42}$ | $G_{41}$ | |
| $r_{18} = -3218.000$ | $d_{18} = 0.2$ | | | | | |
| $r_{19} = 29.949$ | $d_{19} = 4.9$ | $n_{12} = 1.51680$ | $\nu_{12} = 64.12$ | $L_{43}$ | | $G_4$ |
| $r_{20} = 31.637$ | $d_{20} = 49$ | | | | | |
| $r_{21} = -20.200$ | $d_{21} = 1.5$ | $n_{13} = 1.71300$ | $\nu_{13} = 53.97$ | $L_{44}$ | $G_{42}$ | |
| $r_{22} = -46.508$ | $d_{22} = 0.2$ | | | | | |
| $r_{23} = 184.131$ | $d_{23} = 3.5$ | $n_{14} = 1.57501$ | $\nu_{14} = 41.55$ | $L_{45}$ | | |
| $r_{24} = -49.324$ | Bf = 67.047 | | | | | |
| | $f_1 = 129.910$ | $f_{11} = 483.225$ | | $f_{12} = 176.748$ | | |
| | $f_2 = -39.246$ | $f_{21} = -78.321$ | | $f_{22} = -83.527$ | | |
| | $f_3 = 102.999$ | | | | | |
| | $f_4 = 164.790$ | $f_{41} = 124.449$ | | | | | wherein $r_1, r_2, r_3, \ldots$ represent radii of curvature of each lens surface in succession from the object side; $d_1, d_2, d_3, \ldots$ represent center thicknesses of each lens and air spaces between lenses; $n_1, n_2, n_3, \ldots$ represent refractive indexes of each lens for d-line (λ=587.6 nm); $\nu_1, \nu_2, \nu_3, \ldots$ represent Abbe numbers of each lens; Bf represents the focal distance; $f_1, f_2, f_3$ and $f_4$ represent the focal distances of first, second, third, fourth groups, respectively; $f_{11}$ and $f_{12}$ represent focal distances of a cemented positive lens and a positive lens, respectively, in the first group; $f_{21}$ and $f_{22}$ represent focal distances of first cemented negative lens component and second cemented negative lens component, respectively, in the second group; and $f_{41}$ represents focal distance of front group in the fourth group.

13. A telephoto zoom lens according to claim 11, having the numerical data as set forth in the following table:

| Focal distance F = 200~596 | | F-number 9.5 | | Half angle of view ω = 6.2°~2.1° | | |
|---|---|---|---|---|---|---|
| $r_1 = 300.0$ | $d_1 = 2.5$ | $n_1 = 1.75520$ | $\nu_1 = 27.64$ | $L_{11}$ | | |
| $r_2 = 145.035$ | $d_2 = 6.0$ | $n_2 = 1.51680$ | $\nu_2 = 64.12$ | | $G_1$ | |
| $r_3 = 10000.0$ | $d_3 = 0.1$ | | | | | |
| $r_4 = 207.952$ | $d_4 = 5.0$ | $n_3 = 1.51680$ | $\nu_3 = 64.12$ | $L_{12}$ | | |
| $r_5 = -1332.443$ | $d_5 = 4.856\sim126.845$ | | | | | |
| $r_6 = -699.412$ | $d_6 = 3.0$ | $n_4 = 1.7552$ | $\nu_4 = 27.64$ | $L_{21}$ | | |
| $r_7 = -147.0$ | $d_7 = 2.0$ | $n_5 = 1.76684$ | $\nu_5 = 46.76$ | | $G_2$ | |
| $r_8 = 108.126$ | $d_8 = 3.0$ | | | | | |
| $r_9 = -117.455$ | $d_9 = 2.0$ | $n_6 = 1.69680$ | $\nu_6 = 55.61$ | $L_{22}$ | | |
| $r_{10} = 86.530$ | $d_{10} = 3.0$ | $n_7 = 1.80518$ | $\nu_7 = 25.36$ | | | |
| $r_{11} = 3180.161$ | $d_{11} = 61.706\sim1.044$ | | | | | |
| $r_{12} = 270.0$ | $d_{12} = 4.5$ | $n_8 = 1.62280$ | $\nu_8 = 57.03$ | $L_3$-$G_3$ | | |
| $r_{13} = -63.608$ | $d_{13} = 1.8$ | $n_9 = 1.7552$ | $\nu_9 = 27.64$ | | | |
| $r_{14} = -137.0$ | $d_{14} = 67.463\sim6.136$ | | | | | |
| $r_{15} = 84.416$ | $d_{15} = 4.5$ | $n_{10} = 1.48749$ | $\nu_{10} = 70.24$ | $L_{41}$ | | |
| $r_{16} = -218.730$ | $d_{16} = 14.3$ | | | | | |
| $r_{17} = -135.948$ | $d_{17} = 2.5$ | $n_{11} = 1.80454$ | $\nu_{11} = 39.59$ | $L_{42}$ | $G_{41}$ | |
| $r_{18} = -8260.0$ | $d_{18} = 0.2$ | | | | | |
| $r_{19} = 48.395$ | $d_{19} = 4$ | $n_{12} = 1.51680$ | $\nu_{12} = 64.12$ | $L_{43}$ | | $G_4$ |
| $r_{20} = 59.585$ | $d_{20} = 94.5$ | | | | | |
| $r_{21} = -34.560$ | $d_{21} = 2.5$ | $n_{13} = 1.76684$ | $\nu_{13} = 46.76$ | $L_{44}$ | $G_{42}$ | |
| $r_{22} = -93.110$ | $d_{22} = 0.2$ | | | | | |
| $r_{23} = 300.0$ | $d_{23} = 5$ | $n_{14} = 1.62588$ | $\nu_{14} = 35.64$ | $L_{45}$ | | |
| $r_{24} = -90.220$ | Bf = 116.562 | | | | | |

-continued

| Focal distance F = 200~596 | F-number 9.5 | Half angle of view ω = 6.2°~2.1° |
|---|---|---|
| $f_1 = 272$ | $f_{11} = 1207.48$ | $f_{12} = 348.448$ |
| $f_2 = -75$ | $f_{21} = -120.867$ | $f_{22} = -202.916$ |
| $f_3 = 175$ | | |
| $f_4 = 315$ | $f_{41} = 203.298$ | | wherein $r_1, r_2, r_3, \ldots$ represent radii of curvature of each lens surface in succession from the object side; $d_1, d_2, d_3, \ldots$ represent center thicknesses of each lens and air spaces between lenses; $n_1, n_2, n_3, \ldots$ represent refractive indexes of each lens for d-line (λ=587.6 nm); $\nu_1, \nu_2, \nu_3, \ldots$ represent Abbe numbers of each lens; Bf represents back focal distance; $f_1, f_2, f_3$ and $f_4$ represent the focal distances of first, second, third, fourth groups, respectively; $f_{11}$ and $f_{12}$ represent focal distances of a cemented positive lens and a positive lens, respectively, in the first group; $f_{21}$ and $f_{22}$ represent focal distances of first cemented negative lens component and second cemented negative lens component, respectively, in the second group; and $f_{41}$ represents focal distance of front group in the fourth group.

14. A telephoto zoom lens according to claim 2, wherein a shape factor $q_{12}$ of the positive lens at the image side in said first group satisfies the condition:

$$0.8 < q_{12} < 0.95$$

wherein a shape factor q is defined by $$q = [(R_2 + R_1)/(R_2 - R_1)]$$

wherein $R_1$ and $R_2$ represent radii of curvature of a lens at the object side and at the image side, respectively.

15. A telephoto zoom lens according to claim 14, having the numerical data as set forth in the following table:

| Focal distance F = 70~210 | | F-number 4.0 | | Half angle of view ω = 17.8°~5.7° | | |
|---|---|---|---|---|---|---|
| $r_1 = 127.282$ | $d_1 = 1.6$ | $n_1 = 1.80518$ | $\nu_1 = 25.36$ | } $L_{11}$ | } | |
| $r_2 = 70.8$ | $d_2 = 8.5$ | $n_2 = 1.51680$ | $\nu_2 = 64.12$ | | } $G_1$ | |
| $r_3 = -1000.0$ | $d_3 = 0.1$ | | | | | |
| $r_4 = 92.0$ | $d_4 = 6.5$ | $n_3 = 1.51680$ | $\nu_3 = 64.12$ | $L_{12}$ | | |
| $r_5 = -1503.739$ | $d_5 = 1.334~48.813$ | | | | | |
| $r_6 = -914.793$ | $d_6 = 2.8$ | $n_4 = 1.75520$ | $\nu_4 = 27.64$ | } $L_{21}$ | | |
| $r_7 = -78.0$ | $d_7 = 1.0$ | $n_5 = 1.77279$ | $\nu_5 = 49.44$ | | } $G_2$ | |
| $r_8 = 50.4$ | $d_8 = 4.2$ | $n_6 = 1.65160$ | $\nu_6 = 58.54$ | } $L_{22}$ | | |
| $r_9 = -53.551$ | $d_9 = 1.0$ | | | | | |
| $r_{10} = 40.0$ | $d_{10} = 3.5$ | $n_7 = 1.80518$ | $\nu_7 = 25.36$ | | | |
| $r_{11} = 181.772$ | $d_{11} = 30.664~0.082$ | | | | | |
| $r_{12} = 135.0$ | $d_{12} = 5.2$ | $n_8 = 1.65844$ | $\nu_8 = 50.84$ | } $L_3$–$G_3$ | | |
| $r_{13} = -33.3$ | $d_{13} = 1.2$ | $n_9 = 1.80518$ | $\nu_9 = 25.36$ | | | |
| $r_{14} = -71.469$ | $d_{14} = 23.204~6.307$ | | | | | |
| $r_{15} = 35.2$ | $d_{15} = 5.3$ | $n_{10} = 1.62041$ | $\nu_{10} = 60.35$ | $L_{41}$ | } $G_{41}$ | |
| $r_{16} = -366.262$ | $d_{16} = 1.9$ | | | | | |
| $r_{17} = -204.0$ | $d_{17} = 2.0$ | $n_{11} = 1.80518$ | $\nu_{11} = 25.36$ | $L_{42}$ | | } $G_4$ |
| $r_{18} = 516.558$ | $d_{18} = 46.6$ | | | | | |
| $r_{19} = -20.0$ | $d_{19} = 2.3$ | $n_{12} = 1.77279$ | $\nu_{12} = 49.44$ | $L_{43}$ | } $G_{42}$ | |
| $r_{20} = -36.519$ | $d_{20} = 0.2$ | | | | | |
| $r_{21} = 82.964$ | $d_{21} = 5$ | $n_{13} = 1.51454$ | $\nu_{13} = 54.62$ | $L_{44}$ | | |
| $r_{22} = -89.580$ | Bf = 40.953 | | | | | |
| | $f_1 = 116$ | $f_{11} = 359.322$ | | $f_{12} = 167.988$ | | |
| | $f_2 = -33$ | $f_{21} = -60.924$ | | $f_{22} = -77.921$ | | |
| | $f_3 = 86$ | | | | | |
| | $f_4 = 112$ | $f_{41} = 90.663$ | | | | | wherein $r_1, r_2, r_3, \ldots$ represent radii of curvature of each lens surface in succession from the object side; $d_1, d_2, d_3, \ldots$ represent center thicknesses of each lens and air spaces between lenses; $n_1, n_2, n_3, \ldots$ represent refractive indexes of each lens for d-line (λ=587.6 nm); $\nu_1, \nu_2, \nu_3, \ldots$ represent Abbe numbers of each lens; Bf represents back focal distance; $f_1, f_2, f_3$ and $f_4$ represent the focal distances of first, second, third, fourth groups, respectively; $f_{11}$ and $f_{12}$ represent focal distances of a cemented positive lens and a positive lens, respectively, in the first group; $f_{21}$ and $f_{22}$ represent focal distances of first cemented negative lens component and second cemented negative lens component, respectively, in the second group; and $f_{41}$ represents focal distance of front group in the fourth group.

16. A telephoto zoom lens according to claim 14, having the numerical data as set forth in the following table:

| Focal distance F = 70~210 | | F-number 4.0 | | Half angle of view ω = 17.8°~5.8° | | |
|---|---|---|---|---|---|---|
| $r_1 = 127.5$ | $d_1 = 1.6$ | $n_1 = 1.80518$ | $\nu_1 = 25.36$ | } $L_{11}$ | } | |
| $r_2 = 71.0$ | $d_2 = 8.5$ | $n_2 = 1.51680$ | $\nu_2 = 64.12$ | | } $G_1$ | |
| $r_3 = -1005.0$ | $d_3 = 0.1$ | | | | | |
| $r_4 = 90.5$ | $d_4 = 6.5$ | $n_3 = 1.51680$ | $\nu_3 = 64.12$ | $L_{12}$ | | |
| $r_5 = -2073.761$ | $d_5 = 1.494~48.745$ | | | | | |

-continued

| Focal distance F = 70~210 | | F-number 4.0 | | Half angle of view ω = 17.8°~5.8° | | |
|---|---|---|---|---|---|---|
| $r_6 = -2601.874$ | $d_6 = 2.8$ | $n_4 = 1.72825$ | $\nu_4 = 28.34$ | | $L_{21}$ | |
| $r_7 = -70.0$ | $d_7 = 1.0$ | $n_5 = 1.80411$ | $\nu_5 = 46.43$ | | | $G_2$ |
| $r_8 = 49.8$ | $d_8 = 4.2$ | | | | | |
| $r_9 = -52.746$ | $d_9 = 1.0$ | $n_6 = 1.65160$ | $\nu_6 = 58.54$ | | $L_{22}$ | |
| $r_{10} = 40.0$ | $d_{10} = 3.5$ | $n_7 = 1.80518$ | $\nu_7 = 25.36$ | | | |
| $r_{11} = 249.655$ | $d_{11} = 30.171 \sim 0.026$ | | | | | |
| $r_{12} = 150.0$ | $d_{12} = 5.5$ | $n_8 = 1.67003$ | $\nu_8 = 47.05$ | | $L_2\text{-}G_3$ | |
| $r_{13} = -29.0$ | $d_{13} = 1.2$ | $n_9 = 1.80518$ | $\nu_9 = 25.36$ | | | |
| $r_{14} = -67.507$ | $d_{14} = 23.292 \sim 6.187$ | | | | | |
| $r_{15} = 37.5$ | $d_{15} = 5.3$ | $n_{10} = 1.6516$ | $\nu_{10} = 58.54$ | $L_{41}$ | $G_{41}$ | |
| $r_{16} = -421.165$ | $d_{16} = 1.9$ | | | | | |
| $r_{17} = -1000.0$ | $d_{17} = 2.0$ | $n_{11} = 1.80518$ | $\nu_{11} = 25.36$ | $L_{42}$ | | $G_4$ |
| $r_{18} = 178.882$ | $d_{18} = 46.6$ | | | | | |
| $r_{19} = -20.6$ | $d_{19} = 2.3$ | $n_{12} = 1.77279$ | $\nu_{12} = 49.44$ | $L_{43}$ | $G_{42}$ | |
| $r_{20} = -38.184$ | $d_{20} = 0.2$ | | | | | |
| $r_{21} = 100.0$ | $d_{21} = 5.0$ | $n_{13} = 1.50137$ | $\nu_{13} = 56.46$ | $L_{44}$ | | |
| $r_{22} = -72.537$ | $Bf = 41.084$ | | | | | |

$f_1 = 116.0$   $f_{11} = 359.586$   $f_{12} = 167.965$
$f_2 = -33$   $f_{21} = -57.044$   $f_{22} = -84.834$
$f_3 = 86$
$f_4 = 112$   $f_{41} = 90.90377$ wherein $r_1, r_2, r_3, \ldots$ represent radii of curvature of each lens surface in succession from the object side; $d_1, d_2, d_3, \ldots$ represent center thicknesses of each lens and air spaces between lenses; $n_1, n_2, n_3, \ldots$ represent refractive indexes of each lens for d-line ($\lambda = 587.6$ nm); $\nu_1, \nu_2, \nu_3, \ldots$ represent Abbe numbers of each lens; Bf represent back focal distance; $f_1, f_2, f_3$ and $f_4$ represent the focal distances of first, second, third, fourth groups, respectively; $f_{11}$ and $f_{12}$ represent focal distances of a cemented positive lens and a positive lens, respectively, in the first group; $f_{21}$ and $f_{22}$ represent focal distances of first cemented negative lens component and second cemented negative lens component, respectively, in the second group; and $f_{41}$ represents focal distance of front group in the fourth group.

17. A telephoto zoom lens according to claim 14, having the numerical data as set forth in the following table:

| Focal distance F = 70~210 | | F-number 4.0 | | Half angle of view ω = 17.8°~5.7° | | |
|---|---|---|---|---|---|---|
| $r_1 = 102.056$ | $d_1 = 2.0$ | $n_1 = 1.80491$ | $\nu_1 = 25.36$ | | $L_{11}$ | |
| $r_2 = 65.2$ | $d_2 = 9.0$ | $n_2 = 1.48741$ | $\nu_2 = 70.24$ | | | $G_1$ |
| $r_3 = -1440.0$ | $d_3 = 0.1$ | | | | | |
| $r_4 = -96.0$ | $d_4 = 6.0$ | $n_3 = 1.48744$ | $\nu_3 = 70.24$ | | $L_{12}$ | |
| $r_5 = -1555.673$ | $d_5 = 0.486 \sim 47.965$ | | | | | |
| $r_6 = -914.793$ | $d_6 = 2.8$ | $n_4 = 1.75520$ | $\nu_4 = 27.64$ | | $L_{21}$ | |
| $r_7 = -73.0$ | $d_7 = 1.0$ | $n_5 = 1.77279$ | $\nu_5 = 49.44$ | | | $G_2$ |
| $r_8 = 51.0$ | $d_8 = 4.2$ | | | | | |
| $r_9 = -53.7$ | $d_9 = 1.0$ | $n_6 = 1.65160$ | $\nu_6 = 58.54$ | | $L_{22}$ | |
| $r_{10} = 40.0$ | $d_{10} = 3.5$ | $n_7 = 1.80518$ | $\nu_7 = 25.36$ | | | |
| $r_{11} = 174.433$ | $d_{11} = 30.764 \sim 0.183$ | | | | | |
| $r_{12} = 130.0$ | $d_{12} = 5.2$ | $n_8 = 1.65844$ | $\nu_8 = 50.84$ | | $L_3\text{-}G_3$ | |
| $r_{13} = -33.0$ | $d_{13} = 1.2$ | $n_9 = 1.80518$ | $\nu_9 = 25.36$ | | | |
| $r_{14} = -72.663$ | $d_{14} = 23.143 \sim 6.246$ | | | | | |
| $r_{15} = 36.1$ | $d_{15} = 5.3$ | $n_{10} = 1.62041$ | $\nu_{10} = 60.35$ | $L_{41}$ | $G_{41}$ | |
| $r_{16} = -506.153$ | $d_{16} = 1.9$ | | | | | |
| $r_{17} = -210.0$ | $d_{17} = 2.0$ | $n_{11} = 1.80518$ | $\nu_{11} = 25.36$ | $L_{42}$ | | $G_4$ |
| $r_{18} = 481.790$ | $d_{18} = 46.6$ | | | | | |
| $r_{19} = -20.350$ | $d_{19} = 2.3$ | $n_{12} = 1.76684$ | $\nu_{12} = 46.76$ | $L_{43}$ | $G_{42}$ | |
| $r_{20} = -37.829$ | $d_{20} = 0.2$ | | | | | |
| $r_{21} = 95.0$ | $d_{21} = 5.0$ | $n_{13} = 1.53172$ | $\nu_{13} = 49.14$ | $L_{44}$ | | |
| $r_{22} = -83.305$ | $Bf = 41.210$ | | | | | |

$f_1 = 116$   $f_{11} = 295.061$   $f_{12} = 185.721$
$f_2 = -33$   $f_{21} = -61.544$   $f_{22} = -76.981$
$f_3 = 86$
$f_4 = 112$   $f_{41} = 90.7116$ wherein $r_1, r_2, r_3, \ldots$ represent radii of curvature of each lens surface in succession from the object side; $d_1, d_2, d_3, \ldots$ represent center thicknesses of each lens and air spaces between lenses; $n_1, n_2, n_3, \ldots$ represent refractive indexes of each lens for d-line ($\lambda = 587.6$ nm); $\nu_1, \nu_2, \nu_3, \ldots$ represent Abbe numbers of each lens; Bf represents back focal distances; $f_1, f_2, f_3$ and $f_4$ represent the focal distances of first, second, third, fourth groups, respectively; $f_{11}$ and $f_{12}$ represent focal distances of a cemented positive lens and a positive lens, respectively, in the first group; $f_{21}$ and $f_{22}$ represent focal distances of first cemented negative lens component and second cemented negative lens component, respectively, in the second group; and $f_{41}$ represents focal distance of front group in the fourth group.

* * * * *